United States Patent
Hayakawa et al.

(10) Patent No.: US 12,520,496 B2
(45) Date of Patent: Jan. 6, 2026

(54) SEMICONDUCTOR MEMORY DEVICE AND ELECTRONIC SYSTEM INCLUDING THE SAME

(71) Applicant: Samsung Electronics Co., Ltd., Suwon-si (KR)

(72) Inventors: Yukio Hayakawa, Suwon-si (KR); Bongyong Lee, Suwon-si (KR); Hyunmog Park, Suwon-si (KR); Siyeon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 18/153,630

(22) Filed: Jan. 12, 2023

(65) Prior Publication Data

US 2023/0320101 A1    Oct. 5, 2023

(30) Foreign Application Priority Data

Apr. 1, 2022 (KR) .......... 10-2022-0041184

(51) Int. Cl.
*H01L 21/82* (2006.01)
*H10B 51/20* (2023.01)
*H10B 51/30* (2023.01)

(52) U.S. Cl.
CPC .......... *H10B 51/20* (2023.02); *H10B 51/30* (2023.02)

(58) Field of Classification Search
CPC ........ H10B 51/20; H10B 51/30; H10B 51/40; H10B 51/50; G11C 11/223; G11C 11/2273; G11C 11/2275; G11C 16/0483; G11C 16/10; G11C 16/26; H10D 64/689

USPC .......................................................... 257/295

See application file for complete search history.

(56) References Cited

U.S. PATENT DOCUMENTS

| | | | |
|---|---|---|---|
| 9,355,727 B1 | 5/2016 | Zhang et al. | |
| 9,876,025 B2* | 1/2018 | Rabkin | H10D 64/661 |
| 10,079,247 B2 | 9/2018 | Kim | |
| 10,453,861 B1 | 10/2019 | Dong et al. | |
| 10,510,862 B2 | 12/2019 | Ino et al. | |
| 10,903,332 B2* | 1/2021 | Cheng | H10D 30/0323 |
| 10,937,482 B2 | 3/2021 | Sharma et al. | |
| 11,107,516 B1* | 8/2021 | Rabkin | H10D 30/47 |
| 11,688,462 B2* | 6/2023 | Song | H10D 30/693 |
| | | | 365/174 |
| 11,737,281 B2* | 8/2023 | Seki | H10B 43/20 |
| | | | 257/295 |
| 2021/0043654 A1 | 2/2021 | Yoo et al. | |
| 2021/0066344 A1* | 3/2021 | Son | G11C 16/0483 |
| 2021/0111190 A1 | 4/2021 | Lee et al. | |

(Continued)

OTHER PUBLICATIONS

Sakai, Shigeki, et al., "Highly Scalable Fe(Ferroelectric)-NAND Cell with MFIS(Metal-Ferroelectric-Insulator-Semiconductor) Structure for Sub-10nm Tera-Bit Capacity NAND Flash Memories," 2008 Joint Non-Volatile Semiconductor Memory Workshop and International Conference on Memory Technology and Design, IEEE, 2008, p. 103-105.

*Primary Examiner* — Vu A Vu

(74) *Attorney, Agent, or Firm* — Fish & Richardson P.C.

(57) ABSTRACT

A semiconductor memory device includes a back gate electrode, a gate electrode on the back gate electrode, a channel layer between the gate electrode and the back gate electrode, a gate insulating layer between the channel layer and the gate electrode, and a ferroelectric layer between the back gate electrode and the channel layer.

19 Claims, 20 Drawing Sheets

(56) References Cited

U.S. PATENT DOCUMENTS

| | | | |
|---|---|---|---|
| 2023/0262988 A1* | 8/2023 | Harari | H10D 64/033 |
| | | | 257/295 |
| 2023/0292523 A1* | 9/2023 | Song | G11C 11/2275 |
| 2023/0320100 A1* | 10/2023 | Yamazaki | H10B 51/20 |
| | | | 257/295 |
| 2024/0015978 A1* | 1/2024 | Cho | H10B 51/20 |
| 2024/0274203 A1* | 8/2024 | Song | G11C 16/26 |
| 2024/0404602 A1* | 12/2024 | Song | G11C 16/14 |

\* cited by examiner

SEMICONDUCTOR MEMORY DEVICE AND ELECTRONIC SYSTEM INCLUDING THE SAME

CROSS-REFERENCE TO RELATED APPLICATION

This U.S. non-provisional patent application claims priority under 35 U.S.C. § 119 to Korean Patent Application No. 10-2022-0041184, filed on Apr. 1, 2022, in the Korean Intellectual Property Office, the entire contents of which are hereby incorporated by reference.

BACKGROUND

The inventive concepts relate to semiconductor memory devices and electronic systems including the same.

A semiconductor device capable of storing high-capacity data in an electronic system for data storage is required. Accordingly, a method for increasing the data storage capacity of a semiconductor device is studied. For example, as a method for increasing the data storage capacity of the semiconductor device, a semiconductor device including memory cells arranged three-dimensionally instead of two-dimensionally arranged memory cells has been proposed.

SUMMARY

Some example embodiments of the inventive concepts provide a low-power and high-speed semiconductor memory device.

Some example embodiments of the inventive concepts provide an electronic system including a semiconductor memory device.

The inventive concepts are not limited to the above-described example embodiments, and some example embodiments, which are not described above, may be clearly understood by those skilled in the art through the following specification.

According to some example embodiments of the inventive concepts, a semiconductor memory device may include a back gate electrode, a gate electrode on the back gate electrode, a channel layer between the gate electrode and the back gate electrode, a gate insulating layer between the channel layer and the gate electrode, and a ferroelectric layer between the back gate electrode and the channel layer.

According to some example embodiments of the inventive concepts, a semiconductor memory device may include a plurality of cell strings connected between a bit line and a common source line, each cell string of the plurality of cell strings may include a plurality of cell transistors connected in series, and each cell transistor of the plurality of cell transistors may include a back gate electrode, a gate electrode surrounding the back gate electrode, a channel layer between the gate electrode and the back gate electrode, a ferroelectric layer between the channel layer and the back gate electrode, and a gate insulating layer between the gate electrode and the channel layer.

According to some example embodiments of the inventive concepts, a semiconductor memory device may include a stacked structure including gate electrodes and interlayer insulating layers vertically alternately stacked on a substrate, and vertical structures passing through the stacked structure, and each vertical structure of the vertical structures may include a back gate electrode extending in a first direction perpendicular to a top surface of the substrate, a ferroelectric layer surrounding the back gate electrode, and a channel layer surrounding the ferroelectric layer.

According to some example embodiments of the inventive concepts, an electronic system may include a semiconductor memory device including a peripheral circuit structure including peripheral circuits integrated on a semiconductor substrate and peripheral circuit wirings connected to the peripheral circuits; a plurality of cell strings connected between a bit line and a common source line, wherein each cell string of the plurality of cell strings may include a cell array structure including a back gate electrode, a plurality of gate electrodes on the back gate electrode, a channel layer between the plurality of gate electrodes and the back gate electrode, a ferroelectric layer between the back gate electrode and the channel layer, and a gate insulating layer between the channel layer and the plurality of gate electrodes; and an input/output pad electrically connected to the peripheral circuits, and a controller electrically connected to the semiconductor memory device through the input/output pad, the controller configured to control the semiconductor memory device.

According to some example embodiments of the inventive concepts, a method of operating a semiconductor memory device that includes a plurality of cell strings connected between a bit line and a common source line, wherein each cell string of the plurality of cell strings includes a back gate electrode, a plurality of gate electrodes on the back gate electrode, a channel layer between the plurality of gate electrodes and the back gate electrode, a ferroelectric layer between the back gate electrode and the channel layer, and a gate insulating layer between the channel layer and the plurality of gate electrodes, may include applying a first program voltage to the back gate electrode of a selected cell string and applying a second program voltage to the selected gate electrode of the selected cell string.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Figure 1:
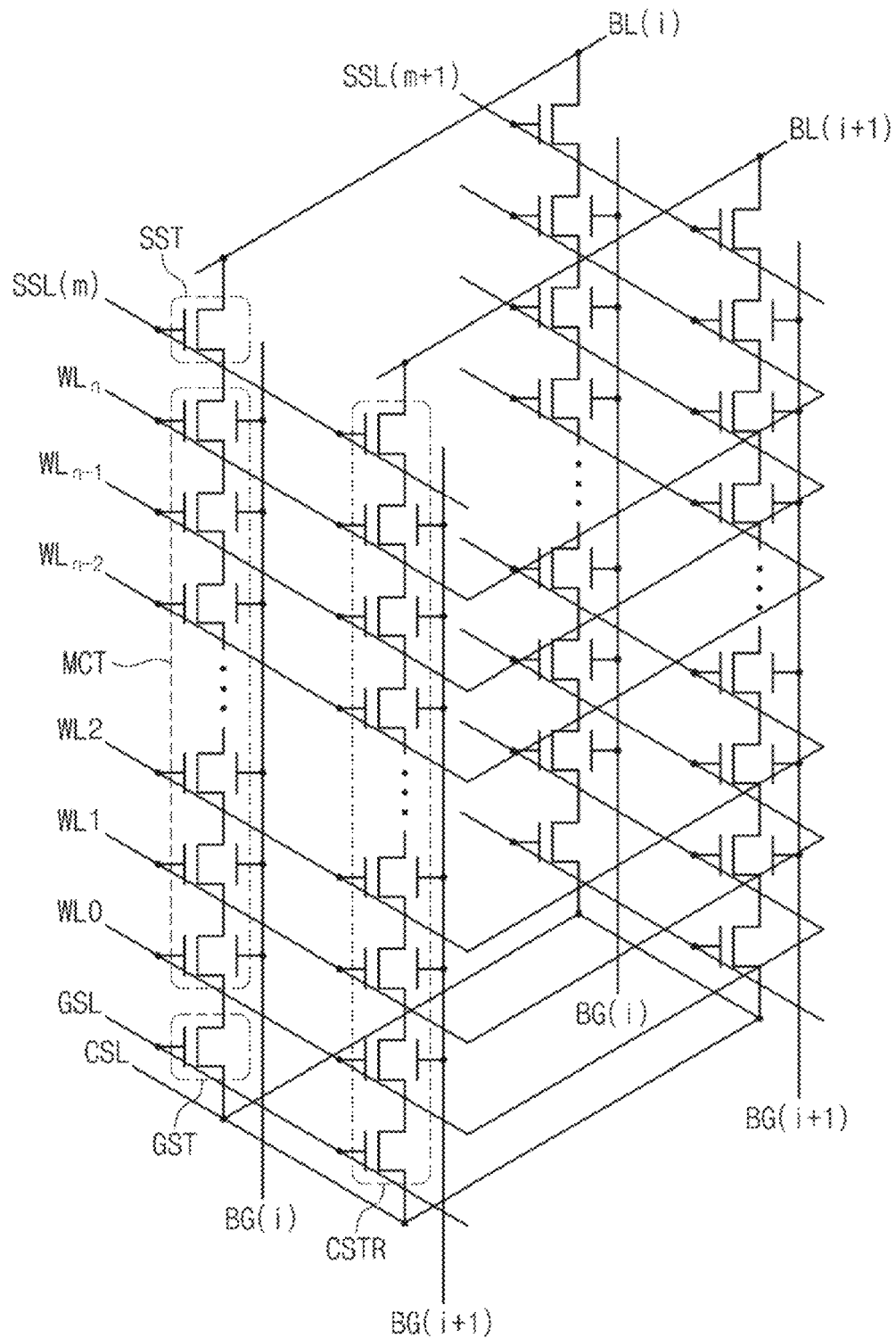
FIG. 1 is a circuit diagram illustrating a cell array of a semiconductor memory device according to some example embodiments of the inventive concepts.

Hereinafter, some example embodiments of the inventive concepts will be described in detail, with reference to the drawings.

It will be understood that when an element is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed "by" performing additional operations, it will be understood that the operation may be performed "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.).

FIG. 1 is a circuit diagram illustrating a cell array of a semiconductor memory device according to some example embodiments of the inventive concepts.

Referring to FIG. 1, a cell array of a semiconductor memory device according to some example embodiments of the inventive concepts may include bit lines BL(i), BL(i+1), a common source line CSL, word lines WL0, WL1 ... WLn, string select lines SSL(m) and SSL(m+1) (or upper select lines), ground select lines GSL (or lower select lines), and cell strings CSTR between the bit line BL(i), BL(i+1) and the common source line CSL (i, n, and m each independently being any positive integer).

The bit lines BL(i) and BL(i+1) may be two-dimensionally arranged, and a plurality of cell strings CSTR may be connected in parallel to each of the bit lines BL(i) and BL(i+1). The cell strings CSTR may be commonly connected to the common source line CSL. That is, the plurality of cell strings CSTR may be disposed between the plurality of bit lines BL(i) and BL(i+1) and one common source line CSL.

According to some example embodiments, each of the cell strings CSTR may include a ground select transistor GST connected to the common source line CSL, a string select transistor SST connected to the bit lines BL(i), BL(i+1), and a plurality of memory cells MCT disposed between the ground and string select transistors GST and SST. The ground select transistor GST, the string select transistor SST, and the memory cells MCT may be connected in series. In some example embodiments, each of the cell strings CSTR may include one or a plurality of string select transistors SST and one or a plurality of ground select transistors GST.

The ground select line GSL, the plurality of word lines WL, and the string select lines SSL(m) and SSL(m+1) may be used as gate electrodes of the ground select transistor GST, the memory cells MCT, and the string select transistors SST, respectively.

The string selection lines SSL(m) and SSL(m+1) may control an electrical connection between the bit lines BL(i) and BL(i+1) and the cell strings CSTR, and the ground selection line GSL(1)) may control an electrical connection between the cell strings CSTR and the common source line CSL. Additionally, the plurality of word lines WL may control the memory cells MCT. In the plurality of cell strings CSTR, the memory cells MCT may be connected to the word line WL positioned at the same level as corresponding memory cell MCT. In some example embodiments, the memory cells MCT of each cell string CSTR may be controlled by back gate lines BG(i) and BG(i+1).

One of the plurality of cell strings CSTR may be selected by the selected one of the bit lines BL(i) and BL(i+1) and the selected one of the string selection lines SSL(m) and SSL(m+1). Additionally, in one selected cell string CSTR, one of the memory cells MCT may be selected by the selected one of the word lines WL0 ... WLn.

According to some example embodiments, each of the memory cells MCT may include a data storage element having a ferroelectric material. Data may be written or erased in each memory cell MCT by using a polarization change of a dipole in the data storage element by voltages input to the word lines WL0 ... WLn and the back gate lines BG(i) and BG(i+1). The data storage element including the ferroelectric material may be used, and thus the semiconductor memory device may operate with relatively low power and may realize a high operating speed.

Figure 2:
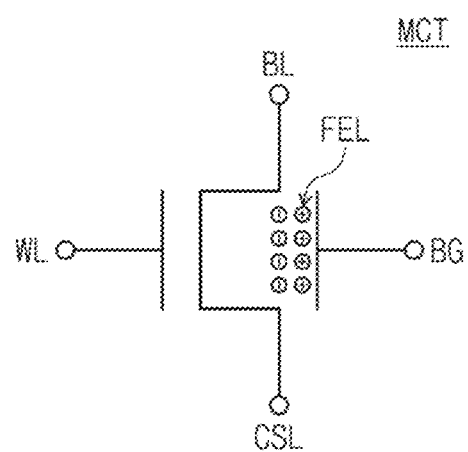
FIG. 2 is a circuit diagram illustrating a unit memory cell according to some example embodiments of the inventive concepts.

FIG. 2 is a circuit diagram illustrating a unit memory cell according to some example embodiments of the inventive concepts.

Referring to FIG. 2, each memory cell MCT may be controlled by a word line WL and back gate lines BG. Each memory cell MCT may include a gate electrode, a source electrode, a drain electrode, a channel between the source electrode and the drain electrode, and a back gate electrode. The gate electrode of each memory cell may be connected to the word line WL, and the back gate electrode may be connected to the back gate line BG. A bit line BL may be connected to the drain electrode, and a common source line CSL may be connected to the source electrode. Each memory cell MCT may include a ferroelectric layer FEL as a memory layer (or data storage layer) between the channel and the back gate electrode.

The ferroelectric layer FEL may have a spontaneous dipole (electric dipole), that is, spontaneous polarization, because charge distribution in each memory cell MCT is non-centrosymmetric. The ferroelectric layer FEL has a residual polarization due to a dipole even in absence of an external electric field. In addition, a direction of polarization may be switched by an external electric field.

That is, the ferroelectric layer FEL may have a positive or negative polarization state, and the polarization state may be changed by an electric field applied to the ferroelectric layer FEL during a program operation. The polarization state of the ferroelectric layer FEL may be maintained even when power is cut off, and thus the semiconductor memory device may operate as a nonvolatile memory device. In some example embodiments, the polarization state of the ferroelectric layer FEL may be determined by a voltage difference between the channel and the back gate electrode.

For example, during a program operation, in the memory cell MCT, the channel may be depleted by a first program voltage applied to the gate electrode, and a polarization of the ferroelectric layer FEL may be changed by a voltage difference between a second program voltage applied to the back gate electrode and the channel. The voltage difference between the second program voltage and the channel may be greater than or equal to a minimum voltage required to change the polarization of the ferroelectric layer FEL.

In an operation of reading data from the memory cell MCT, data stored in the memory cell MCT may be read by measuring a current flowing through the channel of the selected memory cell MCT. Also, a plurality of memory cells may be simultaneously erased by applying an erase voltage to the back gate electrode.

A method of operation of the inventive concepts will be described later in more detail with reference to FIGS. 7A to 9B.

Figure 3A:
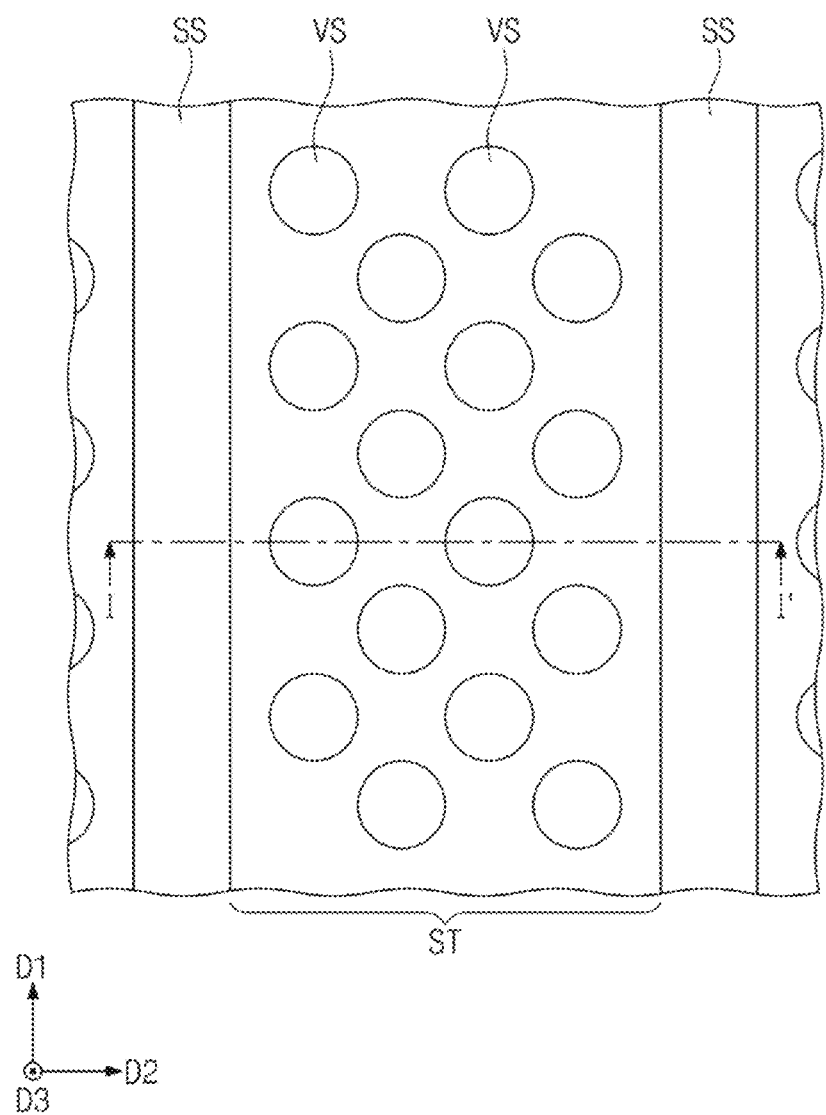
FIG. 3A is a plan view illustrating a cell array of a semiconductor memory device according to some example embodiments of the inventive concepts.
Figure 3B:
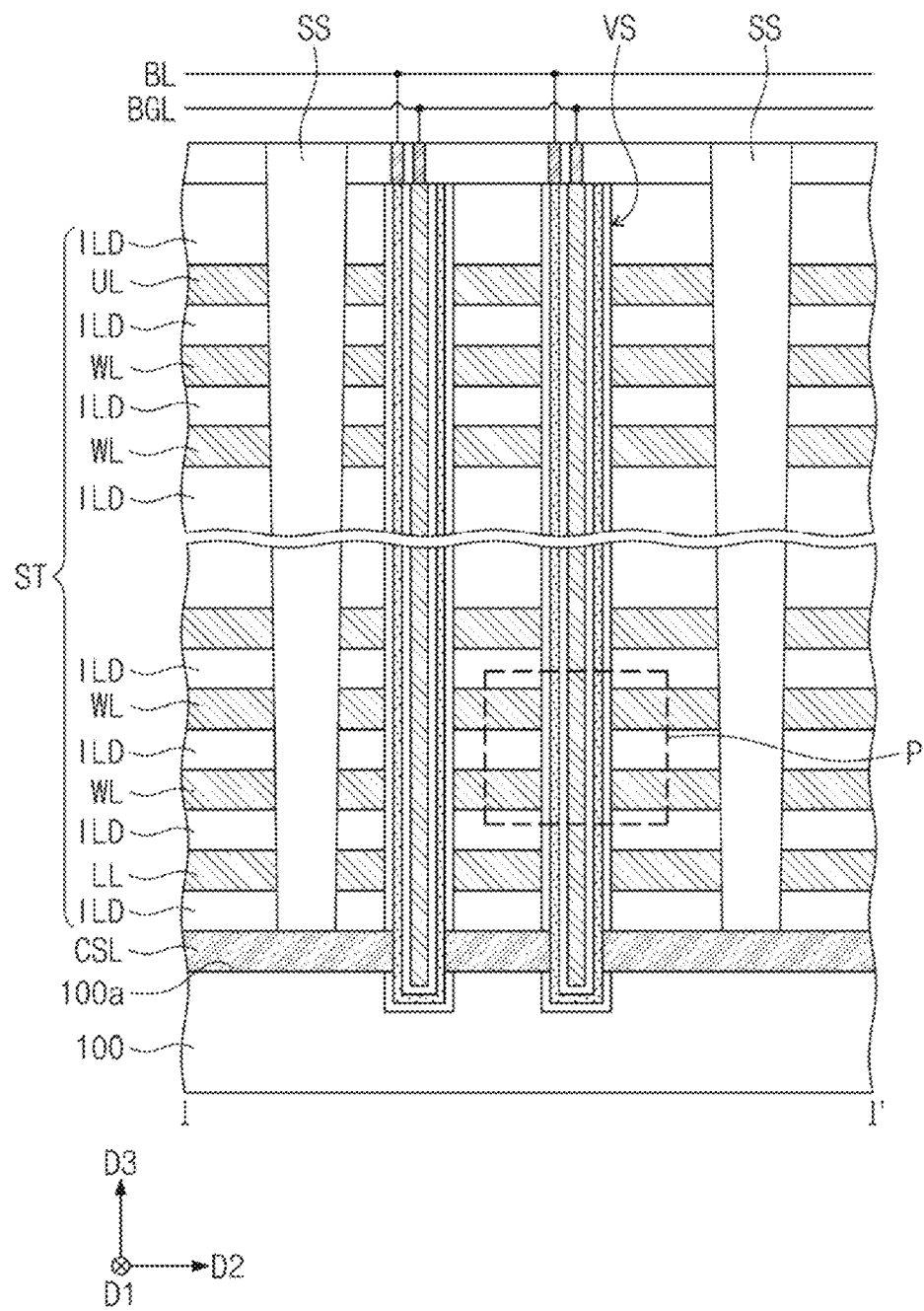
FIG. 3B is a cross-sectional view taken along line I-I' of FIG. 3A.
Figure 4:
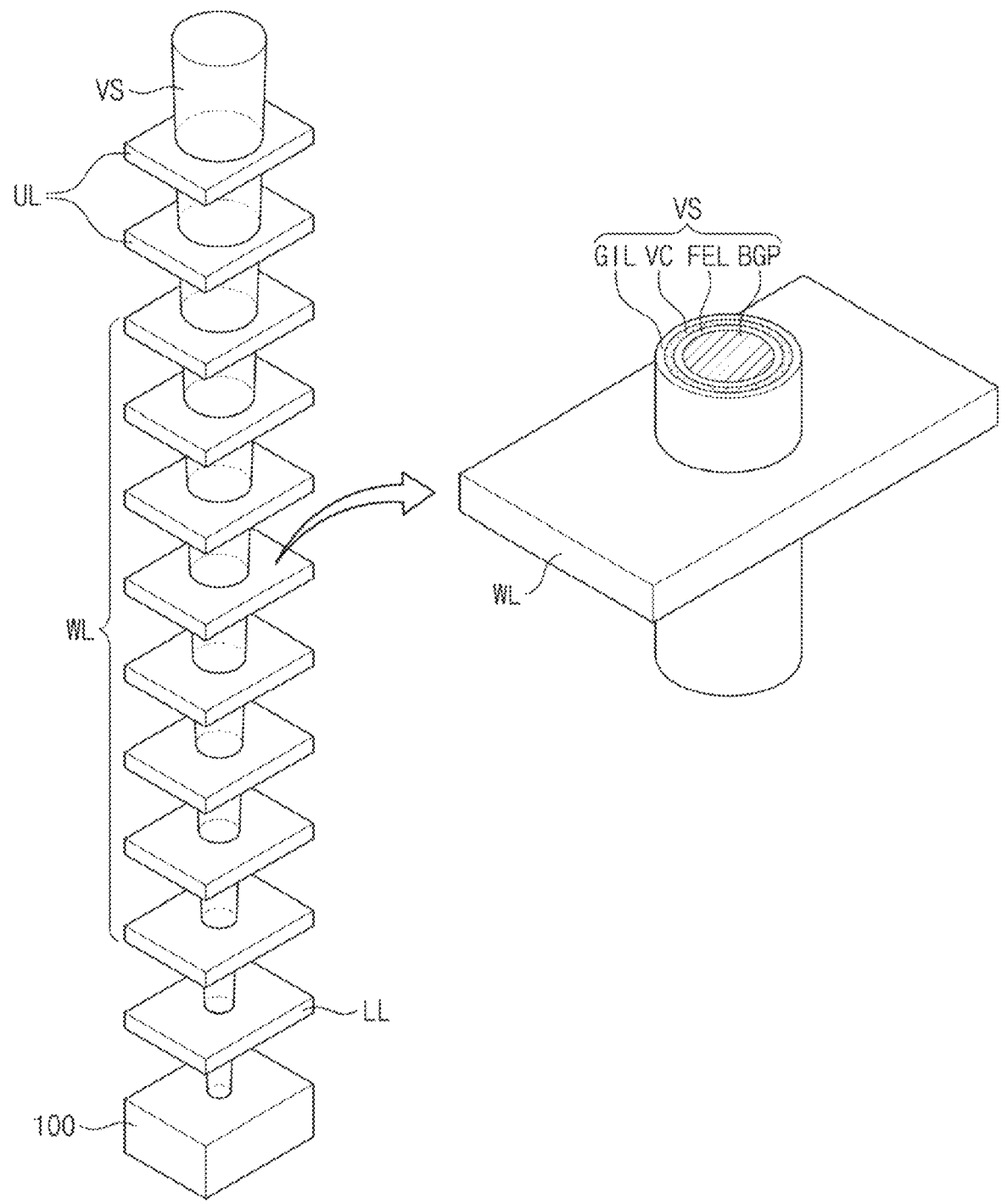
FIG. 4 is a schematic perspective view illustrating a cell string of a semiconductor memory device according to some example embodiments of the inventive concepts.

FIG. 3A is a plan view illustrating a cell array of a semiconductor memory device according to some example embodiments of the inventive concepts, and FIG. 3B is a cross-sectional view taken along line I-I' of FIG. 3A. FIG. 4 is a schematic perspective view illustrating a cell string of a semiconductor memory device according to some example embodiments of the inventive concepts. FIGS. 5A, 5B, 5C, and 5D are enlarged views of part "P" of FIG. 3B.

Referring to FIGS. 3A and 3B, a semiconductor memory device according to some example embodiments may include a stacked structure ST, vertical structures VS, and bit lines BL on a substrate 100. According to some example embodiments, cell strings (CSTR of FIG. 1) shown in FIG. 1 may be integrated on the substrate 100, and the stacked structure ST and the vertical structures VS may constitute the cell strings (CSTR of FIG. 1).

The substrate 100 may be formed of a semiconductor material, an insulating material, or a conductive material. The substrate 100 may include a semiconductor doped with dopants having a first conductivity type (e.g., n-type) and/or an intrinsic semiconductor undoped with impurities. The substrate 100 may have a crystal structure including at least one selected from single crystal, amorphous, and polycrystalline.

The stacked structure ST may be disposed on the substrate 100 and may extend in a first direction D1. The stack structure ST may include gate electrodes UL, WL, and LL and insulating layers ILD, which are alternately stacked in a third direction D3 (i.e., a vertical direction extending perpendicular to a top surface 100a of the substrate 100) perpendicular to first and second directions D1 and D2 crossing each other.

The gate electrodes UL, WL, and LL may include at least one selected from, for example, doped semiconductor (e.g., doped silicon, etc.), metal (e.g., tungsten, copper, aluminum, etc.), conductive metal nitride (e.g., titanium nitride, etc.), tantalum nitride, etc.) or transition metals (e.g., titanium, tantalum, etc.). The insulating layers ILD may include a silicon oxide layer and/or a low dielectric layer. According to some example embodiments, the semiconductor device may be a vertical NAND flash memory device, and, in this case, gate electrodes of the stacked structure ST may be used as string selection lines SSL, word lines WL, and ground selection lines GSL described with reference to FIG. 1, respectively.

A common source line CSL may be disposed between the substrate 100 and the stacked structure ST. The common source line CSL may extend in parallel with the stacked structure ST in the first direction D1. The common source line may include a semiconductor material and a conductive material.

A plurality of vertical structures VS may pass through the stack structure ST. Referring to FIG. 4, the plurality of vertical structures VS may extend in the third direction perpendicular to a top surface 100a of the substrate 100. The vertical structure VS may pass through conductive materials forming the ground selection line GSL, the word lines WLs, and the string selection lines SSL. That is, the ground selection line GSL, the word lines WLs, and the string selection lines SSL may surround the vertical structure VS. The word lines WLs may include dummy word lines not used for data storage. The dummy word line may be used for various purposes. The memory cells according to some example embodiments may be respectively provided between the vertical structures VS and the gate electrodes WL.

The vertical structures VS may be arranged in one direction or arranged in a zigzag manner in a plan view. A width or diameter of the vertical structure VS may increase as a distance from the substrate 100 increases. In other words, the vertical structure VS may have sidewalls inclined with respect to the top surface of the substrate 100.

Figure 5A:
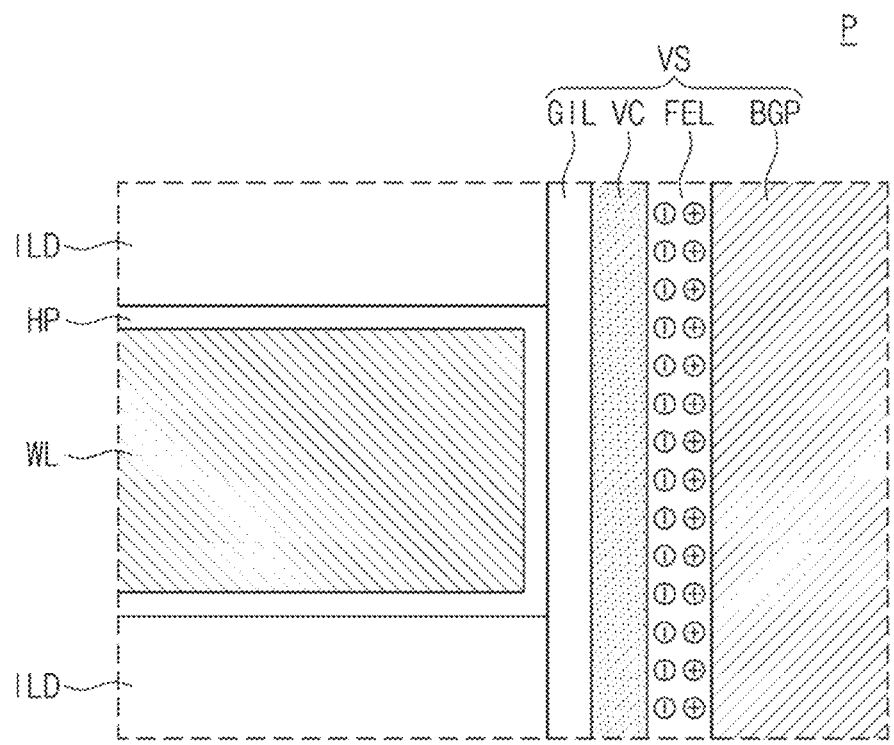
FIGS. 5A, 5B, 5C, and 5D are enlarged views of part "P" of FIG. 3B.

Referring to FIGS. 4 and 5A, in detail, each of the vertical structures VS may include a back gate electrode BGP, a vertical channel layer VC between the gate electrodes WL and the back gate electrode BGP (e.g., surrounding the back gate electrode BGP), a gate insulating layer GIL between the vertical channel layer VC and the gate electrodes WL, and a ferroelectric layer FEL between the back gate electrode BGP and the vertical channel layer VC. In some example embodiments, the back gate electrode BGP, a gate electrode WL, the vertical channel layer VC, the ferroelectric layer FEL and the gate insulating layer GIL may comprise a cell transistor of a plurality of cell transistors of a cell string. In each cell string, each separate cell transistor of the plurality of cell transistors of the cell strings may include a separate portion of the back gate electrode BGP, the vertical channel layer VC, and the ferroelectric layer FEL (e.g., separate portions of each of the back gate electrode BGP, the vertical channel layer VC, and the ferroelectric layer FEL are included in separate cell transistors of a given plurality of cell transistors of a given cell string), such that the back gate electrode BGP, the vertical channel layer VC, and the ferroelectric layer FEL are common to the plurality of cell transistors of the cell string. The ferroelectric layer FEL may be configured to have a polarization of a dipole that may be changed by an electric field applied between the back gate electrode and the channel layer.

The back gate electrode BGP may have a pillar shape extending in the third direction D3. In some example embodiments, the back gate electrode BGP may have a U-shaped cross-section, and the inside thereof may be filled with an insulating material. The back gate electrode BGP may be spaced apart from the substrate 100, and a part of the ferroelectric layer FEL may be positioned between the back gate electrode BGP and the substrate 100. The back gate electrode BGP may include at least one selected from, for example, a doped semiconductor (e.g., doped silicon, etc.), a metal (e.g., tungsten, copper, aluminum, etc.), a conductive metal nitride (e.g., titanium nitride, tantalum nitride, etc.) or transition metals (e.g., titanium, tantalum, etc.).

As a data storage layer, the ferroelectric layer FEL may surround the sidewall of the back gate electrode BGP and may extend in the third direction D3. As shown in at least FIGS. 3B, 4, and 5A, the back gate electrode BGP, the vertical channel layer VC, and the ferroelectric layer FEL may extend in the third direction D3, in parallel with one another (e.g., in parallel with each other). The ferroelectric layer FEL may have a uniform thickness on the sidewall of the back gate electrode BGP. The ferroelectric layer FEL may have a closed pipe shape or a macaroni shape. The ferroelectric layer FEL may have a U-shape. Although the drawing illustrates that the ferroelectric layer FEL includes a single layer, as another example, the ferroelectric layer FEL may include a plurality of ferroelectric layers.

According to some example embodiments, the ferroelectric layer FEL may include a ferroelectric material having polarization characteristics by an electric field applied thereto. The ferroelectric material may be formed of a dielectric material including hafnium. The ferroelectric layer FEL may include, for example, $HfO_2$, Si-doped $HfO_2$ ($HfSiO_2$), Al-doped $HfO_2$ ($HfAlO_2$), HfSiON, HfZnO, $HfZrO_2$, $ZrO_2$, $ZrSiO_2$, $HfZrSiO_2$, ZrSiON, LaAlO, $HfDyO_2$, or HfDyO2.

The vertical channel layer VC may surround the sidewall of the ferroelectric layer FEL, and may extend in the third direction D3. The vertical channel layer VC may have a substantially uniform thickness on the sidewall of the ferroelectric layer FEL. The vertical channel layer VC may include a semiconductor material such as silicon (Si), germanium (Ge), or a mixture thereof. The vertical channel layer VC including a semiconductor material may be used as channels of the string and ground select transistors SST and GST, and the memory cells MCT described with reference to FIG. 1. The vertical channel layer VC may have a pipe shape with a closed bottom or a macaroni shape. The vertical channel layer VC may have a U-shape. For example, a part of the sidewall of the vertical channel layer VC may be in contact (e.g., in direct contact) with the common source line CSL.

The gate insulating layer GIL may surround the sidewall of the vertical channel layer VC and may extend in the third direction D3. The gate insulating layer GIL may have a uniform thickness on the vertical channel layer VC. The gate insulating layer GIL may be formed of an insulating material different from the ferroelectric layer FEL, and may be formed of a non-ferroelectric material. For example, the gate insulating layer GIL may surround the sidewall of the vertical channel layer VC on the top surface of the common source line CSL.

The gate insulating layers GIL may include, for example, a single layer selected from a high dielectric layer, a silicon oxide layer, a silicon nitride layer, and a silicon oxynitride layer, or a combination thereof. For example, the high dielectric layer may include at least one of hafnium oxide, hafnium silicon oxide, lanthanum oxide, zirconium oxide, zirconium silicon oxide, tantalum oxide, titanium oxide, barium strontium titanium oxide, barium titanium oxide, strontium titanium oxide, lithium oxide, aluminum oxide, lead scandium tantalum oxide, and lead zinc niobate.

A horizontal insulating pattern HP may conformally cover the sidewalls of the gate electrodes adjacent to the vertical structures VS, and the top and bottom surface of each of the gate electrodes. The horizontal insulating pattern HP may include a high dielectric layer such as an aluminum oxide layer and a hafnium oxide layer.

Figure 5B:
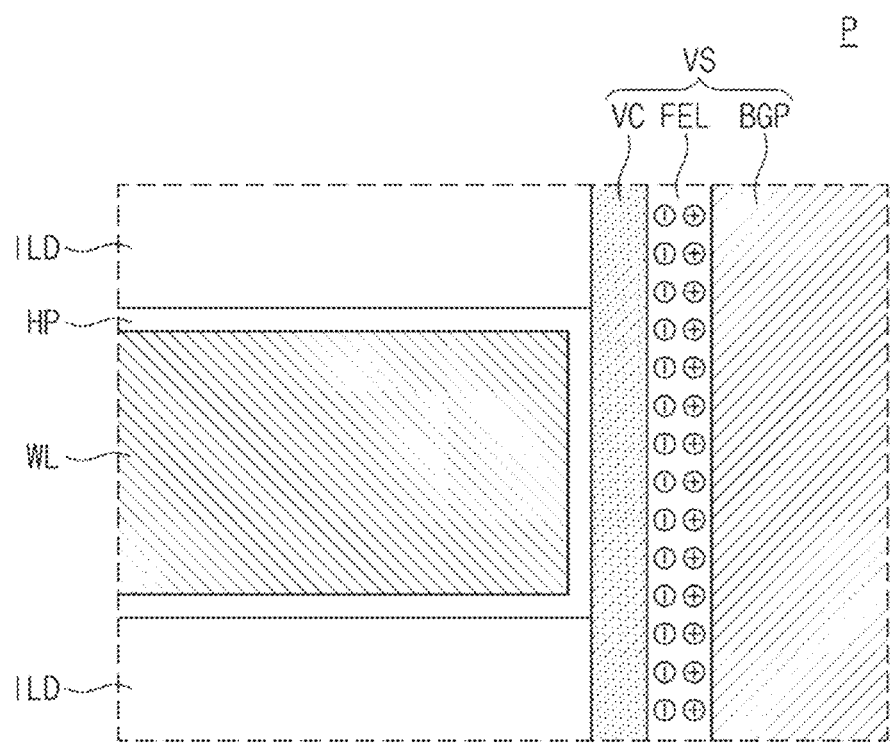

Referring to FIG. 5B, the gate insulating layer GIL may be omitted from the vertical structure VS, and the horizontal insulating pattern HP may be in contact with the vertical channel layer VC, directly (e.g., in direct contact).

Figure 5C:
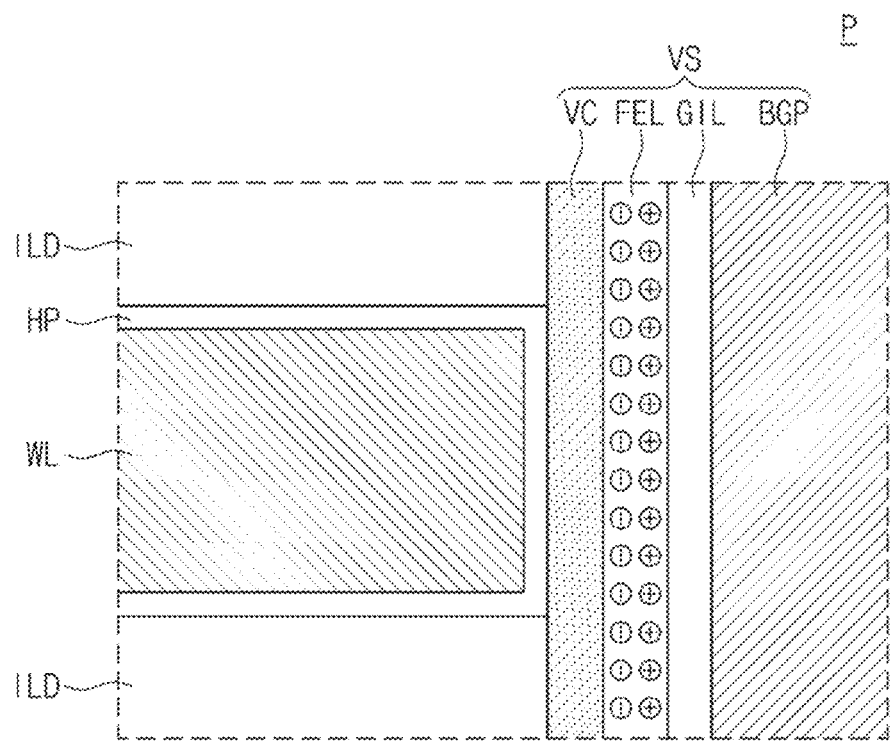

Referring to FIG. 5C, in the vertical structure VS, the gate insulating layer GIL may be disposed between the back gate electrode BGP and the ferroelectric layer FEL.

Figure 5D:
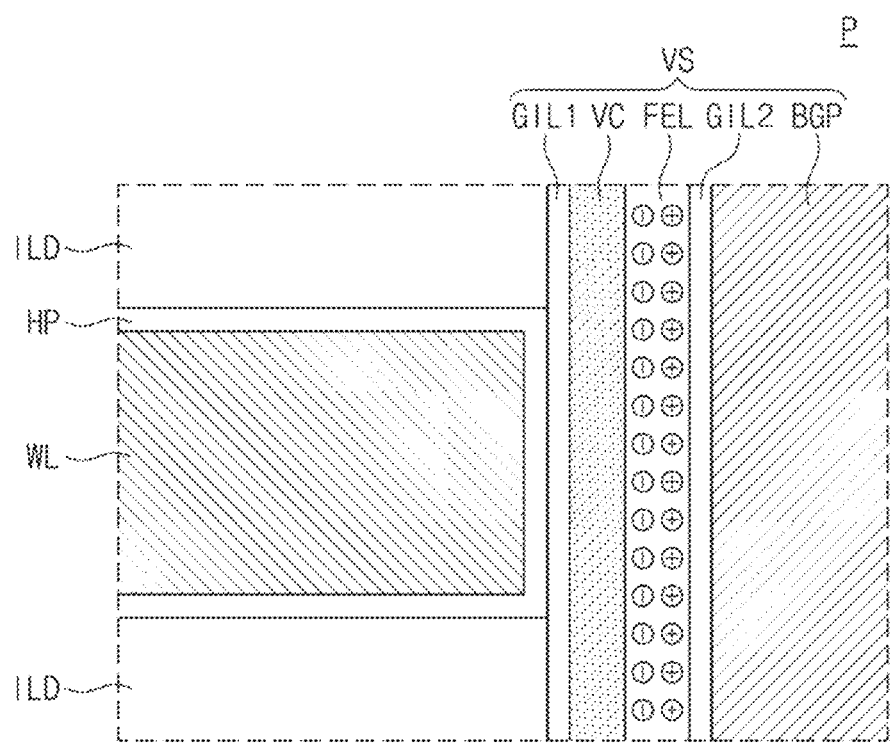

As another example, referring to FIG. 5D, the vertical structure VS may include a first gate insulating layer GIL1 between the vertical channel layer VC and the gate electrode WL, and a second gate insulating layer GIL2 between the back gate electrode BGP and the ferroelectric layer FEL. The first and second gate insulating layers GIL1 and GIL2 may be formed of an insulating material different from that of the ferroelectric layer FEL, and may be formed of a non-ferroelectric material.

Referring again to FIGS. 3A and 3B, separation structures SS may pass through the stack structure ST on the substrate 100. Each of the separation structures SS may include an insulating layer covering the sidewall of the stack structure ST. Each of the separation structures SS may have a single-layer or multi-layer structure.

The separation structures SS may extend in the first direction D1 in parallel with the stack structure ST, and may be spaced apart from one another in the second direction D2 intersecting the first direction D1. The stacked structure ST may be disposed between the separation structures SS adjacent to each other. The separation structures SS may be disposed on the substrate 100 or the common source line CSL. Top surfaces of the separation structures SS may be located at substantially the same level, and may be located at a higher level than top surfaces of the vertical structures VS.

Although the bit lines BL and the back gate lines BGL are omitted from the plan views, the bit lines BL and the back gate lines BGL may cross the stack structure ST to extend in the direction D2.

The bit lines BL may be connected to the vertical channel layer VC of each vertical structure VS through bit line contact plugs. The back gate lines BGL may be connected to the back gate electrode BGP of each vertical structure VS through a back gate plug.

Figure 6:
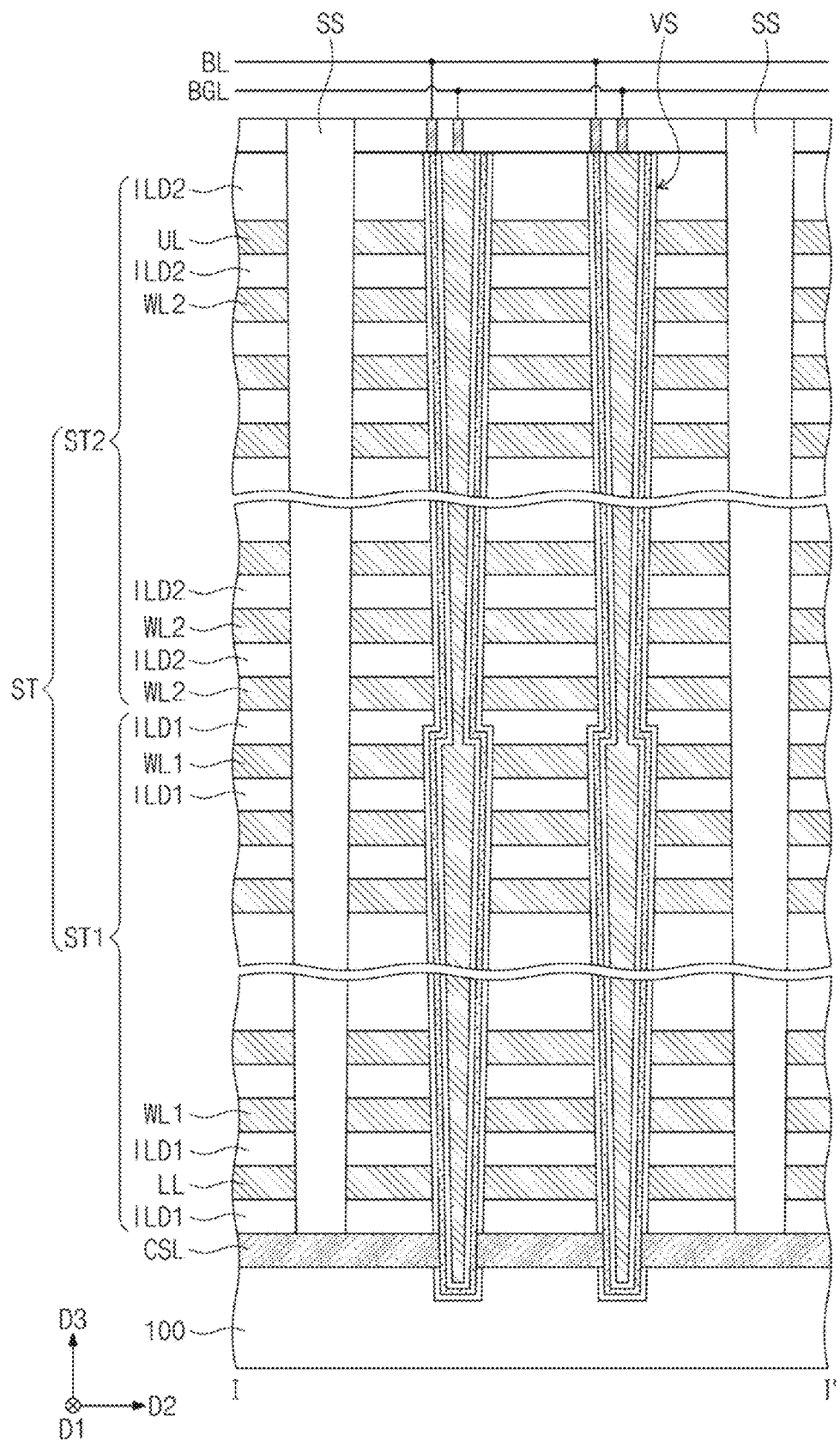
FIG. 6 is a cross-sectional view taken along line I-I' of FIG. 3A.

FIG. 6 is a cross-sectional view taken along line I-I' of FIG. 3A. In some example embodiments, including the example embodiments shown in FIG. 6, detailed descriptions of technical features overlapping with those previously described with reference to FIGS. 3A, 3B, and 4 will be omitted, and differences will be described in detail.

Referring to FIGS. 3A and 6, the stacked structure ST on the substrate 100 may include a first stacked structure ST1 and a second stacked structure ST2 on the first stacked structure ST1. The first stacked structure ST1 may include first gate electrodes WL1 stacked on the substrate 100 in a direction perpendicular to the substrate 100 (i.e., the third direction D3). The first stacked structure ST1 may further include first insulating layers ILD1 that space the stacked first gate electrodes WL1 apart from one another. The first insulating layers ILD1 and the first gate electrodes WL1 of the first stacked structure ST1 may be alternately stacked in the third direction D3. A second insulating layer ILD2 may be provided on the uppermost part of the first stacked structure ST1.

The second stacked structure ST2 may include second gate electrodes WL2 stacked on the first stacked structure ST1 in the third direction D3. The second stacked structure ST2 may further include the second insulating layers ILD2 that space the stacked second gate electrodes WL2 apart from one another. The second insulating layers ILD2 and the second gate electrodes WL2 of the second stacked structure ST2 may be alternately stacked in the third direction D3.

Each of the vertical structures VS may include a first vertical extension penetrating the first stacked structure ST1, a second vertical extension penetrating the second stacked structure ST2, and an expansion between the first and second vertical extensions. The expansion may be provided in the uppermost interlayer insulating layer ILD of the first stacked structure ST1. A diameter of the vertical structure VS may increase rapidly in the expansion.

Figure 7A:
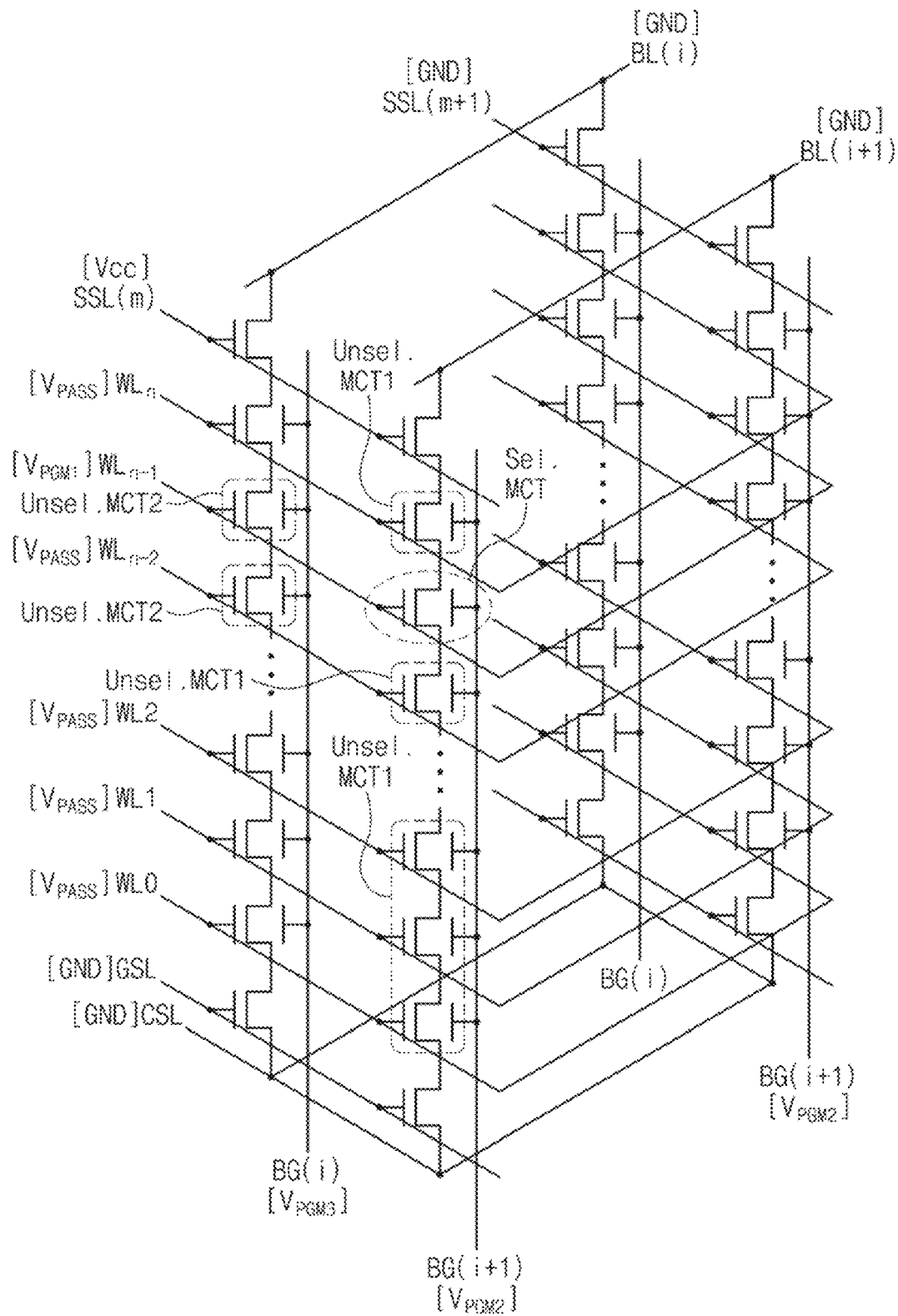
FIG. 7A is a circuit diagram illustrating a voltage condition in a program operation of a semiconductor memory device according to some example embodiments of the inventive concepts.
Figure 7B:
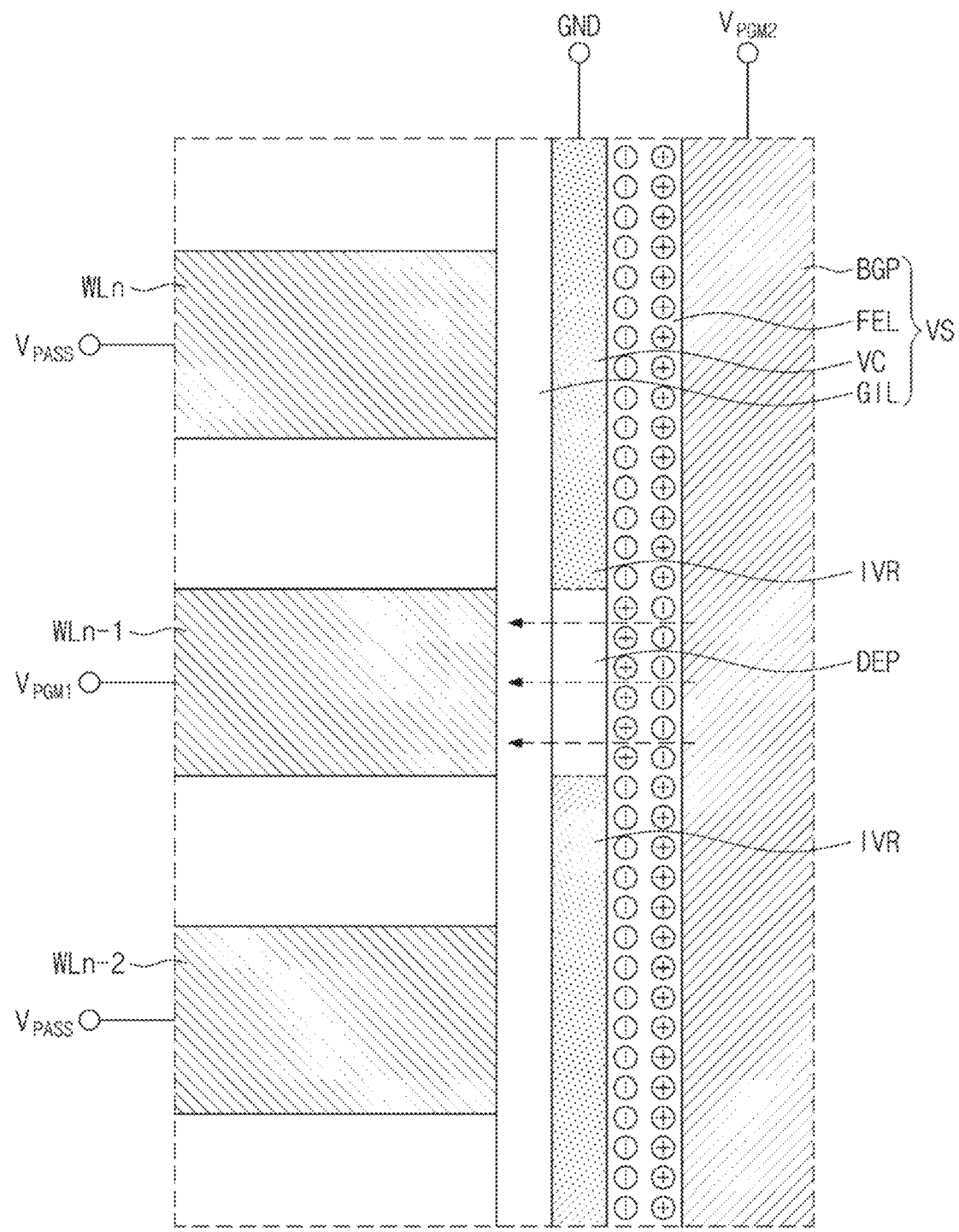
FIG. 7B is a diagram for illustrating a program operation of a semiconductor memory device according to some example embodiments of the inventive concepts.

FIG. 7A is a circuit diagram illustrating a voltage condition in a program operation of a semiconductor memory device according to some example embodiments of the inventive concepts. FIG. 7B is a diagram for illustrating a program operation of a semiconductor memory device according to some example embodiments of the inventive concepts.

Referring to FIGS. 7A and 7B, during a program operation, one cell string and one memory cell Sel. MCT may be selected. That is, a ground voltage GND may be applied to bit lines BL(i) and BL(i+1), a power voltage Vcc may be applied to a selected string selection line SSL(m), and the ground voltage GND may be applied to an unselected string selection line SSL(m+1) (i and m each independently being any positive integer). Also, the ground voltage GND may be applied to a ground selection lines GSL. A first program voltage VPGM1 may be applied to a selected word line WLn−1, and a pass voltage VPASS may be applied to unselected word lines WLn and WLn−2. Furthermore, a second program voltage VPGM2 may be applied to a selected back gate line BG(i+1), and a third program voltage VPGM3 may be applied to an unselected back gate line BG(i).

Here, the first program voltage VPGM1 may be less than the pass voltage VPASS. The second program voltage VPGM2 may be greater than the first program voltage VPGM1 and less than the pass voltage VPASS. The third program voltage VPGM3 may be greater than the first program voltage VPGM1 and less than the second program voltage VPGM2.

For example, the pass voltage VPASS may be about 5V, and the first program voltage VPGM1 may be about −6V. The second program voltage VPGM2 may be about 2V, and the third program voltage VPGM3 may be about −2V.

Under the above voltage condition, a depletion region DEP may be formed in the vertical channel layer VC of the selected memory cell Sel. MCT by the first voltage VPGM1, and a polarization may be changed in the ferroelectric film FEL by a difference between the first program voltage VPGM1 and the third program voltage VPGM3, and thus the polarization of the ferroelectric film FEL may be set to a first polarization state. Here, the first polarization state may be a state in which positive charges are accumulated in the ferroelectric layer FEL to be adjacent to the vertical channel layer. Accordingly, the first polarization state (low threshold voltage, corresponding to the write data voltage) may be stored in the memory layer. Here, the difference (e.g., about Δ8V) between the first program voltage VPGM1 and the second program voltage VPGM2 may be greater than or equal to a minimum voltage difference required to set the polarization of the ferroelectric layer FEL to the first polarization state.

Under the voltage condition, in unselected first memory cells Unsel. MCT1 of the selected cell string, an inversion region IVR may be formed in the vertical channel layer VC by the pass voltage VPASS, and the ground voltage may be transmitted to the inversion region IVR. In the unselected first memory cells Unsel. MCT1, an electric field applied to the ferroelectric layer FEL may correspond to a voltage difference (e.g., Δ2V) between the ground voltage GND and the third program voltage VPGM3, and the voltage difference may be smaller than the minimum voltage for changing the polarization of the ferroelectric layer FEL. In the unselected first memory cells Unsel. MCT1, the ferroelectric layer FEL may have a second polarization state opposite to the first polarization state. Here, the second polarization state may be a state in which negative charges are accumulated in the ferroelectric layer FEL to be adjacent to the vertical channel layer VC.

Further, under the voltage condition, the electric field applied to the ferroelectric film FEL in the unselected second memory cell Unsel. MCT2 connected to the selected word line WLn−1 may correspond to a difference (e.g., about Δ4V) between the first program voltage VPGM1 and the third program voltage VPGM3, and the voltage difference may be smaller than the minimum voltage for changing the polarity of the ferroelectric layer FEL.

As described above, the electric field applied to the ferroelectric layer FEL of the unselected first and second memory cells Unsel. MCT1 and Unsel. MCT2 may be reduced. Accordingly, it is possible to reduce program disturbance in which data written in the unselected first memory cell Unsel. MCT1 is erased by the pass voltage VPASS in the unselected first memory cells Unsel. MCT1, or unintentional data is recorded. In addition, it is possible to reduce program disturbance caused by the first program voltage PGM1 in the unselected second memory cell Unsel. MCT2. For example, based on a semiconductor memory device including at least a back gate electrode BGP, a gate electrode WL on the back gate electrode, a vertical channel layer VC between the gate electrode WL and the back gate electrode BGP, a gate insulating layer GIL between the vertical channel layer VC and the gate electrode WL, and a ferroelectric layer FEL between the back gate electrode BGP and the vertical channel layer VC according to some example embodiments, for example the semiconductor memory device as shown in at least on of FIGS. 3A to 5D, such that the ferroelectric layer FEL may be between the vertical channel layer VC and the back gate electrode BGP, program disturbance (e.g., pass disturbance, data disturbance, etc.) associated with the semiconductor memory device including the ferroelectric layer FEL may be reduced, thereby enabling the semiconductor memory device including the ferroelectric layer FEL to have improved performance and/or reliability.

Figure 8A:
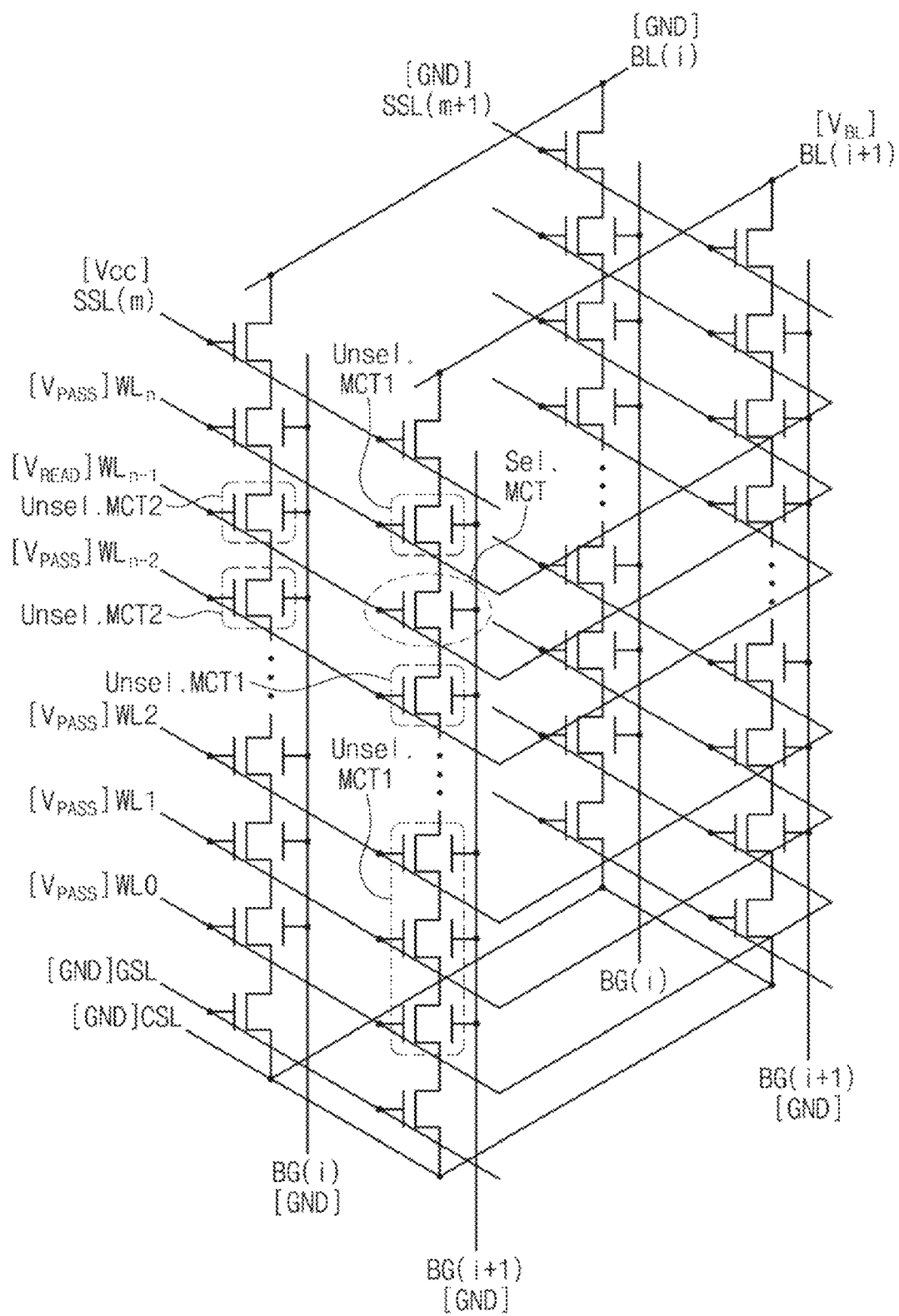
FIG. 8A is a circuit diagram illustrating a voltage condition in a read operation of a semiconductor memory device according to some example embodiments of the inventive concepts.
Figure 8B:
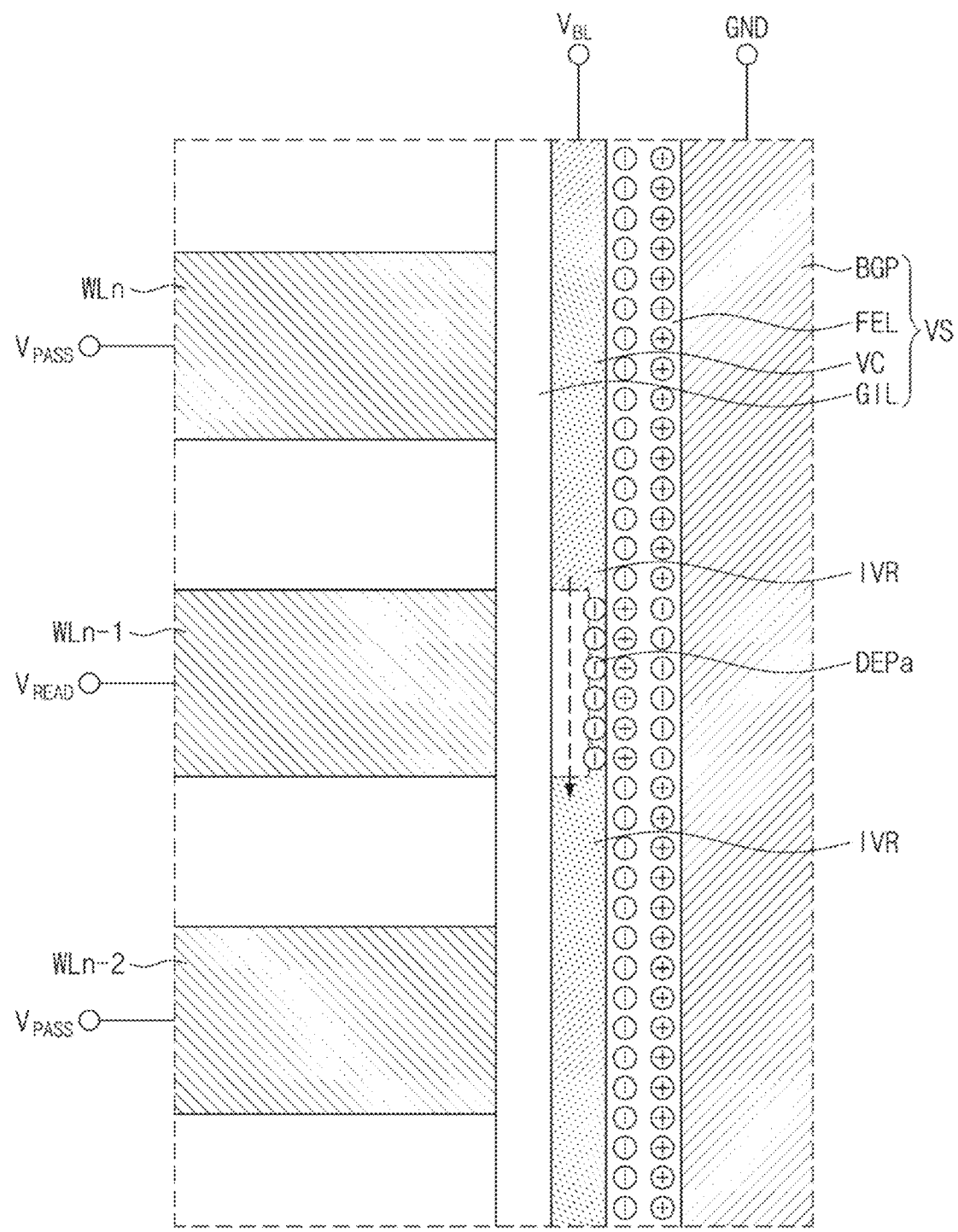
FIGS. 8B and 8C are diagrams for illustrating a read operation of a three-dimensional semiconductor memory device according to some example embodiments of the inventive concepts.
Figure 8C:
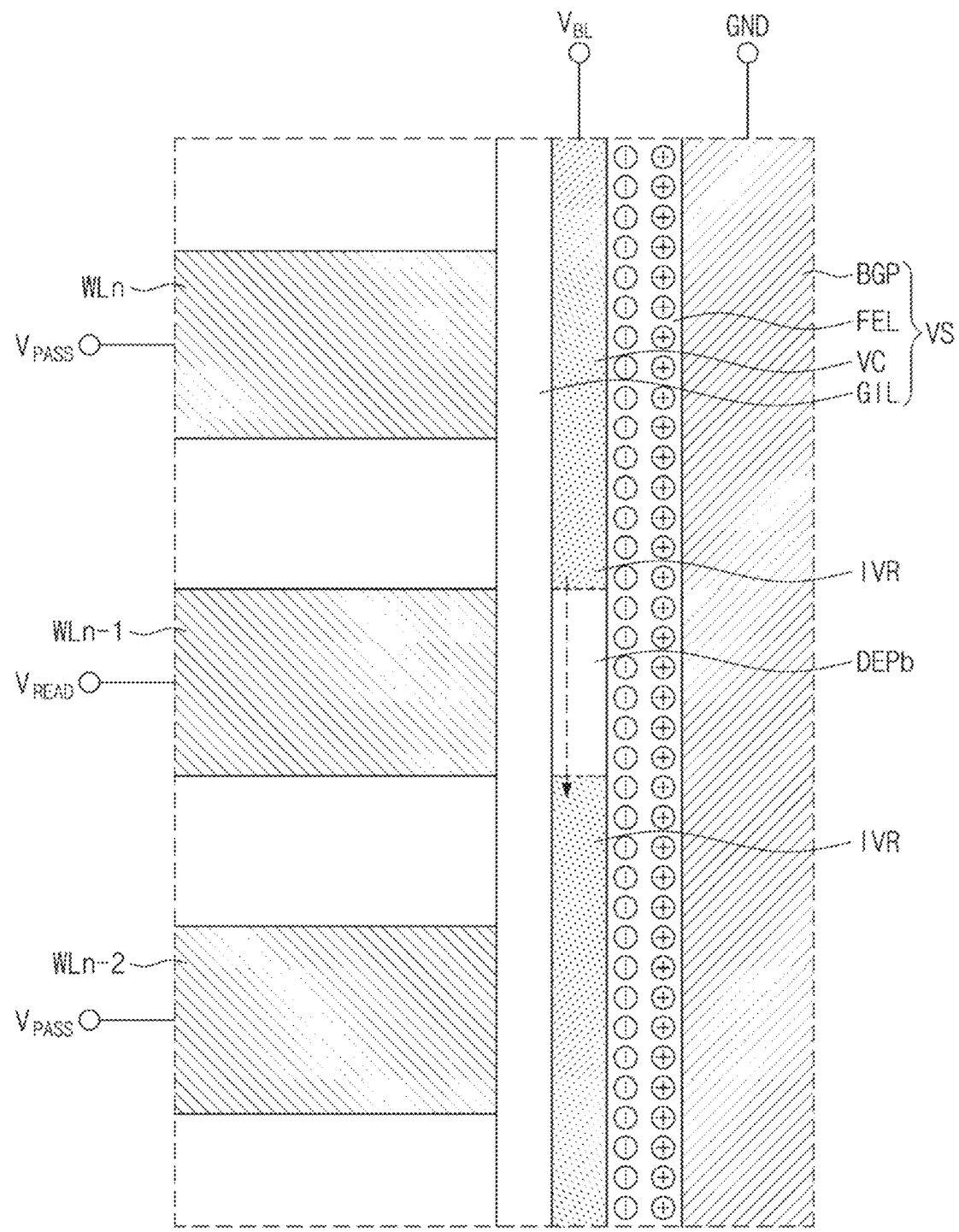

FIG. 8A is a circuit diagram illustrating a voltage condition in a read operation of a semiconductor memory device according to some example embodiments of the inventive concepts. FIGS. 8B and 8C are diagrams for illustrating a read operation of a three-dimensional semiconductor memory device according to some example embodiments of the inventive concepts.

Referring to FIGS. 8A and 8B, one cell string and one memory cell Sel. MCT may be selected during a read operation. That is, a bit line voltage VBL may be applied to the selected bit line BL(i+1) and the ground voltage GND may be applied to the unselected bit line BL(i). The power voltage Vcc may be applied to the selected string select line SSL(m), and the ground voltage GND may be applied to the unselected string select line SSL(m+1). Also, the ground voltage GND may be applied to the ground selection lines GSL.

A read voltage VREAD may be applied to the selected word line WLn−1, and the pass voltage VPASS may be applied to the unselected word lines WLn and WLn−2. Furthermore, the ground voltage GND may be applied to the back gate lines BG(i) and BG(i+1). Here, the read voltage VREAD may be smaller than the pass voltage VPASS. For example, the pass voltage VPASS may be about 5V, and the read voltage VREAD may be about 1.5V.

Data of the selected memory cell may be read by measuring a current value flowing through the vertical channel layer VC of the selected cell string. That is, when the ferroelectric layer FEL has the first polarization state in the selected memory cell Sel. MCT, as shown in FIG. 8A, charges may be induced in a depletion region DEPa by a dipole of the ferroelectric layer FEL, and thus the selected memory cell Sel. MCT may have a low threshold voltage. Accordingly, the current may flow through the vertical channel layer VC in the selected memory cell Sel. MCT. In some example embodiments, as shown in FIG. 8C, when the ferroelectric layer FEL in the selected memory cell Sel. MCT has the second polarization state, a depletion region DEPb may be formed in the vertical channel layer VC and the selected memory cell Sel. MCT may have a high threshold voltage. Accordingly, the amount of current flowing through the vertical channel layer VC in the selected memory cell Sel. MCT may decrease.

Figure 9A:
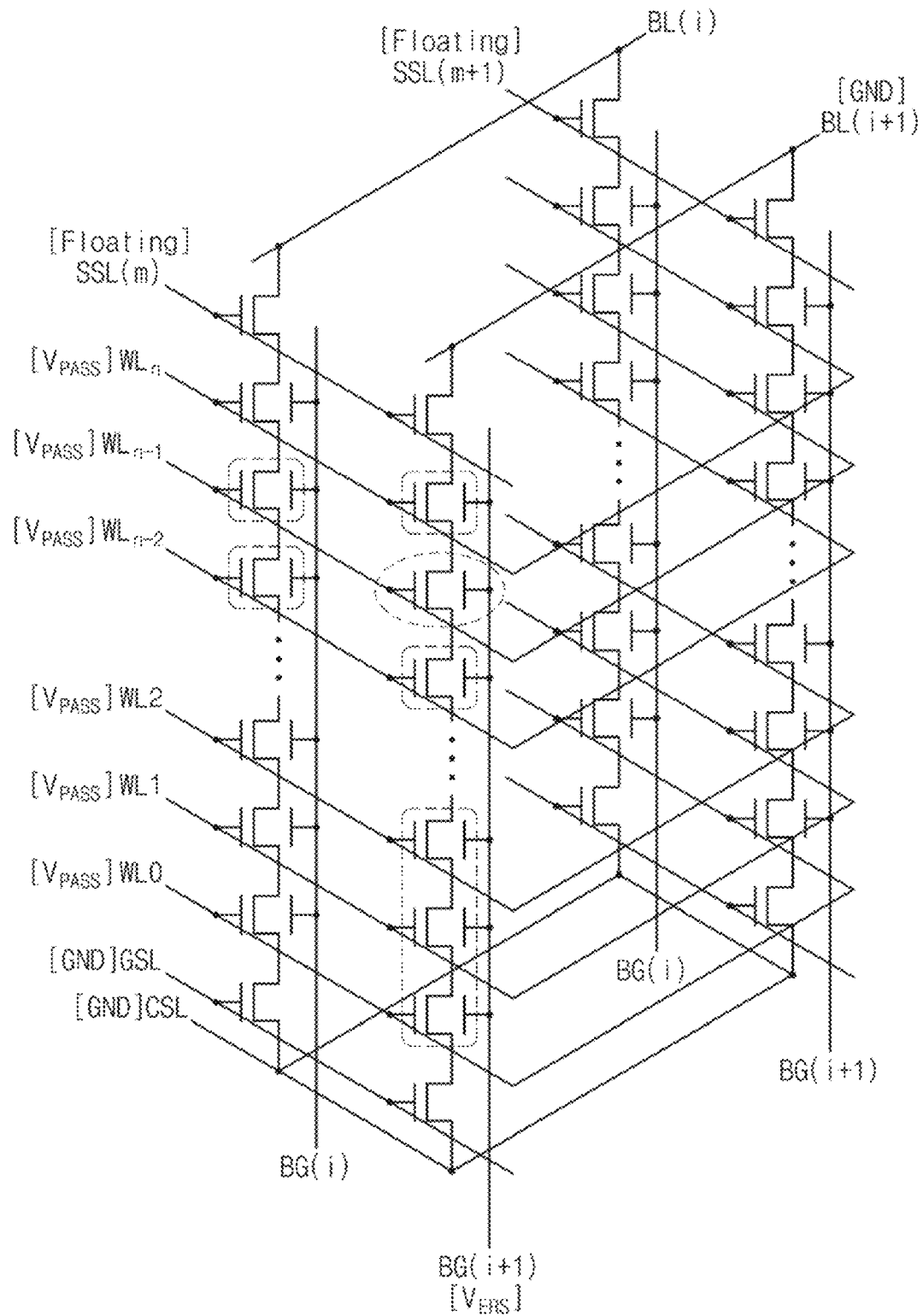
FIG. 9A is a circuit diagram illustrating a voltage condition in an erase operation of a semiconductor memory device according to some example embodiments of the inventive concepts.
Figure 9B:
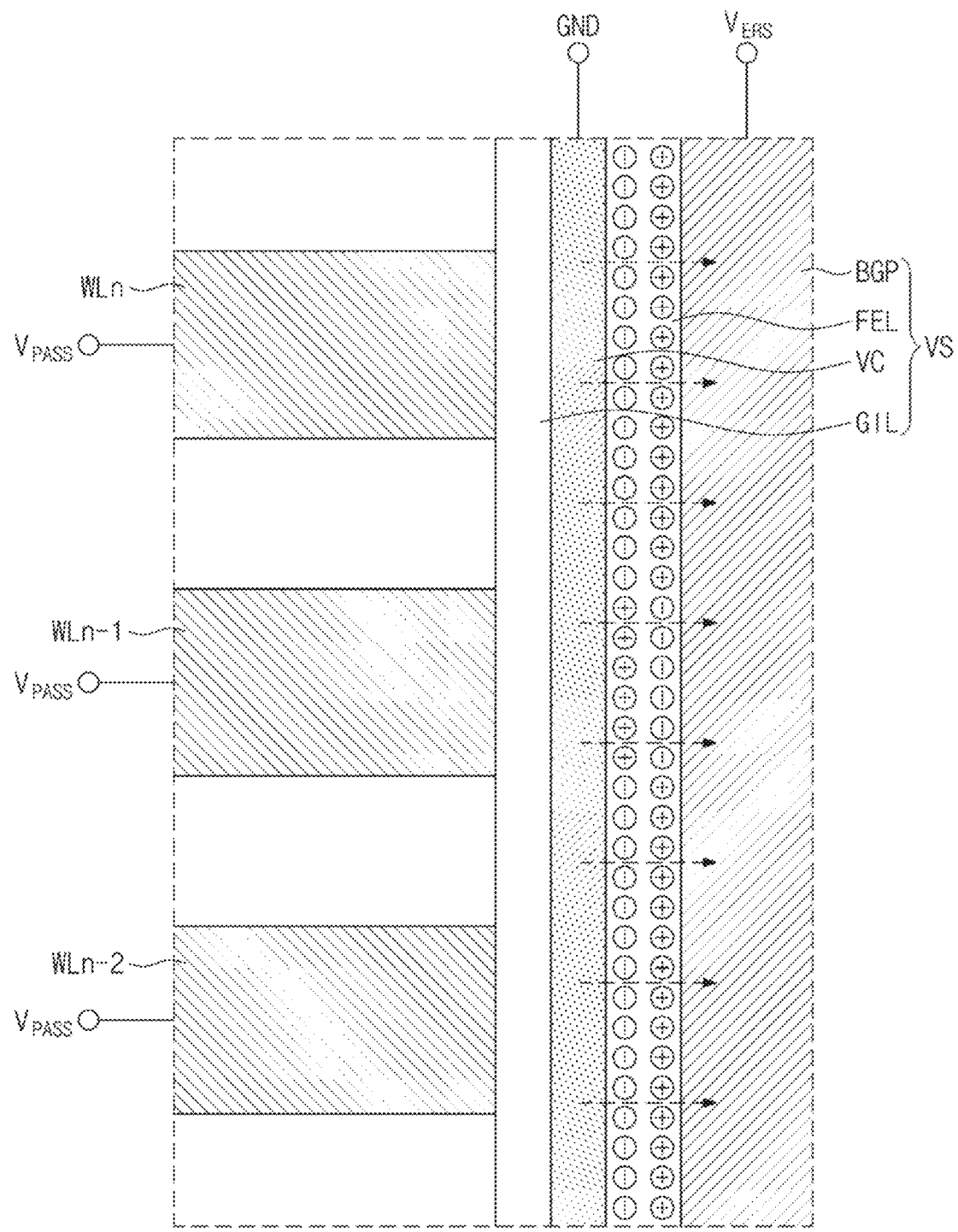
FIG. 9B is a diagram for illustrating an example erase operation of a semiconductor memory device according to some example embodiments of the inventive concepts.

FIG. 9A is a circuit diagram illustrating a voltage condition in an erase operation of a semiconductor memory device according to some example embodiments of the inventive concepts. FIG. 9B is a diagram for illustrating an example erase operation of a semiconductor memory device according to some example embodiments of the inventive concepts.

Referring to FIGS. 9A and 9B, an erase operation on memory cells may be performed in units of memory blocks. That is, the ground voltage GND may be applied to the bit lines BL(i) and BL(i+1) connected to the cell strings of each memory block, and the pass voltage VPASS may be applied to the word lines WL. The string selection lines SSL(m) and SSL(m+1) may float, and the ground voltage GND may be applied to the common source line CSL and the ground selection lines GSL.

Furthermore, an erase voltage VERS may be applied to the back gate lines BG(i) and BG(i+1). An electric field applied to the ferroelectric layer FEL of the memory cells during the erase operation may correspond to a difference between the first program voltage VPGM1 and the third program voltage VPGM3. That is, the erase voltage VERS may be, for example, about 8V or more. For example, the ferroelectric layers FEL of all memory cells may have the second polarization state due to the erase voltage VERS applied to the back gate electrode BGP.

Figure 10:
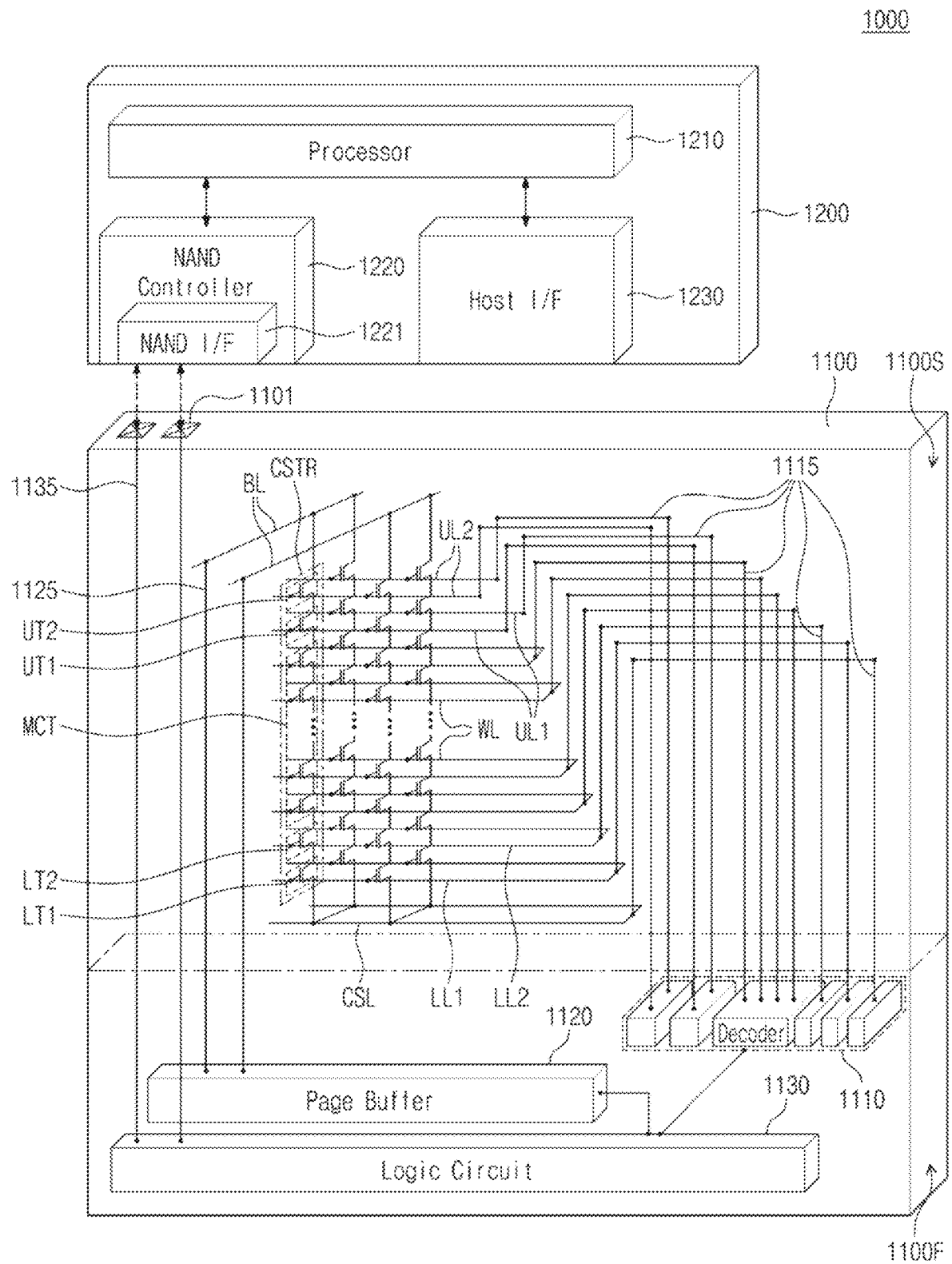
FIG. 10 is a diagram schematically illustrating an electronic system including a semiconductor memory device according to some example embodiments of the inventive concepts.

FIG. 10 is a diagram schematically illustrating an electronic system including a semiconductor memory device according to some example embodiments of the inventive concepts.

Referring to FIG. 10, an electronic system 1000 according to some example embodiments of the inventive concepts may include a semiconductor device 1100 and a controller 1200 electrically connected to the semiconductor device 1100. The electronic system 1000 may be a storage device including one or a plurality of semiconductor devices 1100 or an electronic device including a storage device. For example, the electronic system 1000 may be a solid state drive device (SSD), a universal serial bus (USB), a computing system, a medical device, or a communication device, which includes one or a plurality of semiconductor devices 1100.

The semiconductor device 1100 may be a non-volatile memory device, for example, a NAND flash memory device. The semiconductor device 1100 may include a first structure 1100F and a second structure 1100S on the first structure 1100F. In some example embodiments, the first structure 1100F may be disposed next to the second structure 1100S.

The first structure 1100F may be a peripheral circuit structure including a decoder circuit 1110, a page buffer 1120, and a logic circuit 1130. The second structure 1100S may be a memory cell structure including a bit line BL, a common source line CSL, word lines WL, first and second gate upper lines UL1 and UL2, and first and second gate lower lines LL1 and LL2, and memory cell strings CSTR between the bit line BL and the common source line CSL.

In the second structure 1100S, each of the memory cell strings CSTR may include lower transistors LT1 and LT2 adjacent to the common source line CSL, and upper transistors UT1 and UT2 adjacent to the bit line BL, and a plurality of memory cells MCT disposed between the lower transistors LT1 and LT2 and the upper transistors UT1 and UT2. The number of the lower transistors LT1 and LT2 and the number of the upper transistors UT1 and UT2 may be variously modified according to some example embodiments.

In some example embodiments, the upper transistors UT1 and UT2 may include a string select transistor, and the lower transistors LT1 and LT2 may include a ground select transistor. The gate lower lines LL1 and LL2 may be gate electrodes of the lower transistors LT1 and LT2, respectively. The word lines WL may be gate electrodes of the memory cells MCT, and the gate upper lines UL1 and UL2 may be gate electrodes of the upper transistors UT1 and UT2, respectively.

The memory cells MCT of each memory cell string CSTR may be controlled by a back gate line.

The common source line CSL, the first and second gate lower lines LL1 and LL2, the word lines WL, and the first and second gate upper lines UL1 and UL2 may be electrically connected to the decoder circuit 1110 through first connection wires 1115 extending from the first structure 1100F to the second structure 1100S. The bit lines BL may be electrically connected to the page buffer 1120 through second connection lines 1125 extending from the first structure 1100F to the second structure 1100S.

In the first structure 1100F, the decoder circuit 1110 and the page buffer 1120 may perform a control operation on at least one selected memory cell among the plurality of memory cells MCT. The decoder circuit 1110 and the page buffer 1120 may be controlled by the logic circuit 1130. The semiconductor device 1100 may communicate with the controller 1200 through input/output pad 1101 electrically connected to the logic circuit 1130. The input/output pad 1101 may be electrically connected to the logic circuit 1130 through an input/output connection line 1135 extending from the first structure 1100F to the second structure 1100S.

Although not shown in the drawings, the first structure 1100F may include a voltage generator (not shown). The voltage generator may generate a program voltage, a read voltage, a pass voltage, and a verification voltage required for the operation of the memory cell strings CSTR. Here, the program voltage may be a relatively high voltage (e.g., 20V to 40V) compared to the read voltage, the pass voltage, and the verification voltage.

In some example embodiments, the first structure 1100F may include high voltage transistors and low voltage transistors. The decoder circuit 1110 may include pass transistors connected to the word lines WL of the memory cell strings CSTR. The pass transistors may include high voltage transistors capable of withstanding a high voltage such as a program voltage applied to the word lines WL during a program operation. The page buffer 1120 may also include high voltage transistors capable of withstanding a high voltage.

The controller 1200 may include a processor 1210, a NAND controller 1220, and a host interface 1230. In some example embodiments, the electronic system 1000 may include a plurality of semiconductor devices 1100, and in this case, the controller 1200 may control the plurality of semiconductor devices 1100.

The processor 1210 may control the overall operation of the electronic system 1000 including the controller 1200. The processor 1210 may operate according to a predetermined firmware, and may access the semiconductor device 1100 by controlling the NAND controller 1220. The NAND controller 1220 may include a NAND interface 1221 that handles communication with the semiconductor device 1100. A control command for controlling the semiconductor device 1100, data to be written to the memory cells MCT of the semiconductor device 1100, data to be read from the memory cells MCT of the semiconductor device 1100 may be transmitted. The host interface 1230 may provide a communication function between the electronic system 1000 and an external host. When receiving a control command from an external host through the host interface 1230, the processor 1210 may control the semiconductor device 1100 in response to the control command.

Figure 11:
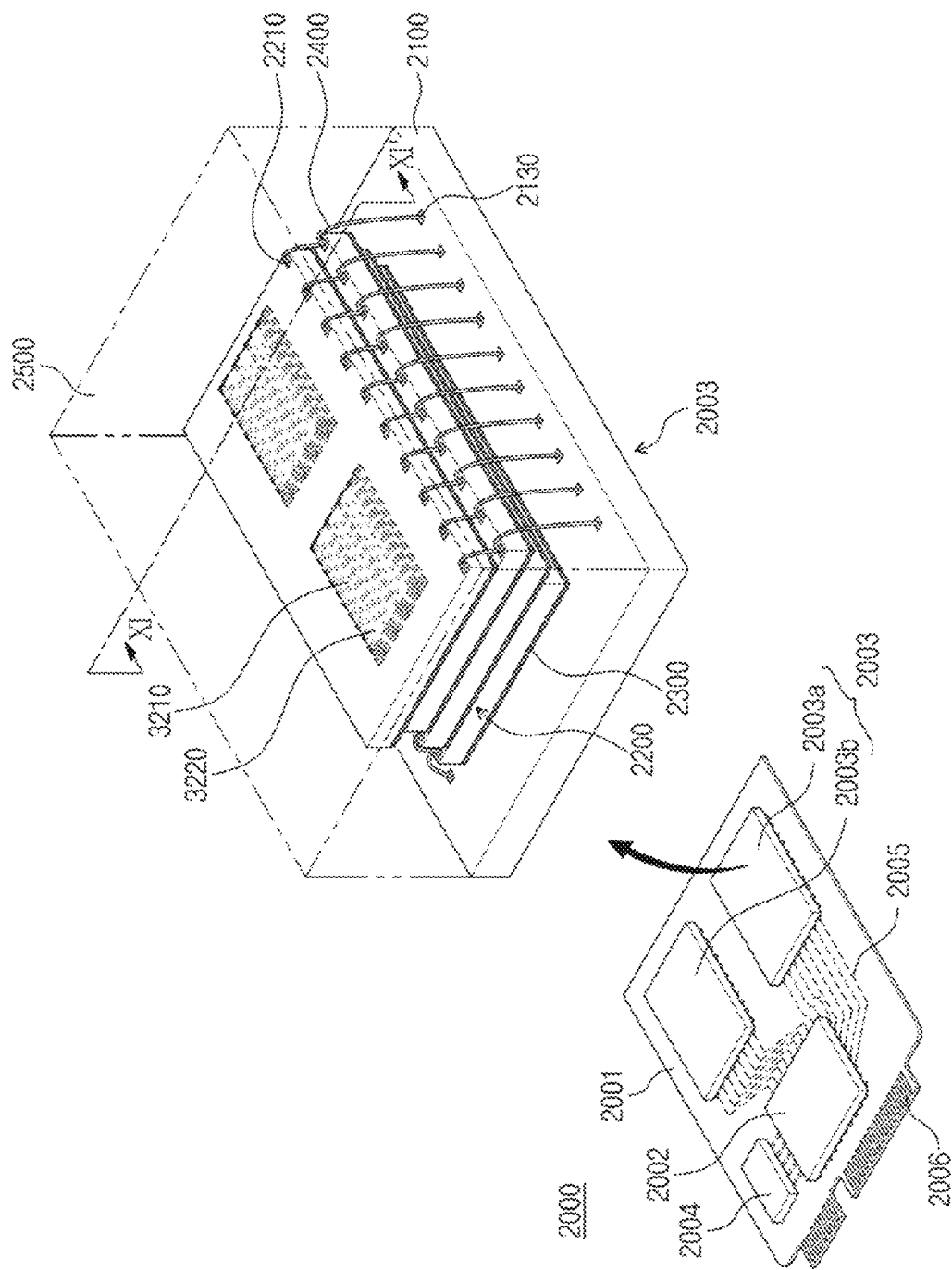
FIG. 11 is a perspective view schematically illustrating an electronic system including a semiconductor memory device according to some example embodiments of the inventive concepts.

FIG. 11 is a perspective view schematically illustrating an electronic system including a semiconductor memory device according to some example embodiments of the inventive concepts.

Referring to FIG. 11, an electronic system 2000 according to some example embodiments of the inventive concepts may include a main board 2001, a controller 2002, and one or more semiconductor packages 2003 and DRAM 2004 which are mounted on the main board 2001. The semiconductor package 2003 and the DRAM 2004 may be connected to the controller 2002 by wiring patterns 2005 formed on the main board 2001.

The main board 2001 may include a connector 2006 including a plurality of pins coupled to an external host. The number and arrangement of the plurality of pins in the connector 2006 may vary depending on a communication interface between the electronic system 2000 and the external host. In some example embodiments, the electronic system 2000 may communication with the external host depending on one of interfaces such as a Universal Serial Bus (USB), Peripheral Component Interconnect Express (PCI-Express), Serial Advanced Technology Attachment (SATA), M-Phy for Universal Flash Storage (UFS). In some example embodiments, the electronic system 2000 may operate by power supplied from an external host through the connector 2006. The electronic system 2000 may further include a power management integrated circuit (PMIC) for distributing power supplied from the external host to the controller 2002 and the semiconductor package 2003.

The controller 2002 may write data to or read data from the semiconductor package 2003, and may improve the operating speed of the electronic system 2000.

The DRAM 2004 may be a buffer memory for alleviating a speed difference between the semiconductor package 2003, which is a data storage space, and an external host. The DRAM 2004 included in the electronic system 2000 may operate as a kind of cache memory, and may provide a space for temporarily storing data in a control operation for the semiconductor package 2003. When the DRAM 2004 is included in the electronic system 2000, the controller 2002 may further include a DRAM controller for controlling the DRAM 2004 in addition to the NAND controller for controlling the semiconductor package 2003.

The semiconductor package 2003 may include first and second semiconductor packages 2003a and 2003b spaced apart from each other. Each of the first and second semiconductor packages 2003a and 2003b may be a semiconductor package including a plurality of semiconductor chips 2200. Each of the first and second semiconductor packages 2003a and 2003b may include a package substrate 2100, semiconductor chips 2200 on the package substrate 2100, adhesive layers 2300 disposed on a bottom surface of each of the semiconductor chips 2200, a connection structure 2400 electrically connecting the semiconductor chips 2200 and the package substrate 2100, and a molding layer 2500 covering the semiconductor chips 2200 and the connection structure 2400 on the package substrate 2100.

The package substrate 2100 may be a printed circuit board including upper pads 2130. Each semiconductor chip 2200 may include an input/output pad 2210. The input/output pad 2210 may correspond to the input/output pad 1101 of FIG. 10. Each of the semiconductor chips 2200 may include stacked structures 3210 and vertical structures 3220. Each of the semiconductor chips 2200 may include a semiconductor device according to some example embodiments described below.

In some example embodiments, the connection structure 2400 may be a bonding wire electrically connecting the input/output pad 2210 and the upper pads 2130. Accordingly, in each of the first and second semiconductor packages 2003a and 2003b, the semiconductor chips 2200 may be electrically connected to each other by a bonding wire method, and may be electrically connected to the upper pads 2130 of the package substrate 2100. According to some example embodiments, in each of the first and second semiconductor packages 2003a and 2003b, the semiconductor chips 2200 may be electrically connected to each other by a connection structure including a through silicon via (TSV), instead of the bonding wire-type connection structure 2400.

In some example embodiments, the controller 2002 and the semiconductor chips 2200 may be included in one package. In some example embodiments, the controller 2002 and the semiconductor chips 2200 may be mounted on a separate interposer substrate different from the main board 2001, and the controller 2002 and the semiconductor chips may be connected to each other by wiring formed on the interposer substrate.

Figure 12:
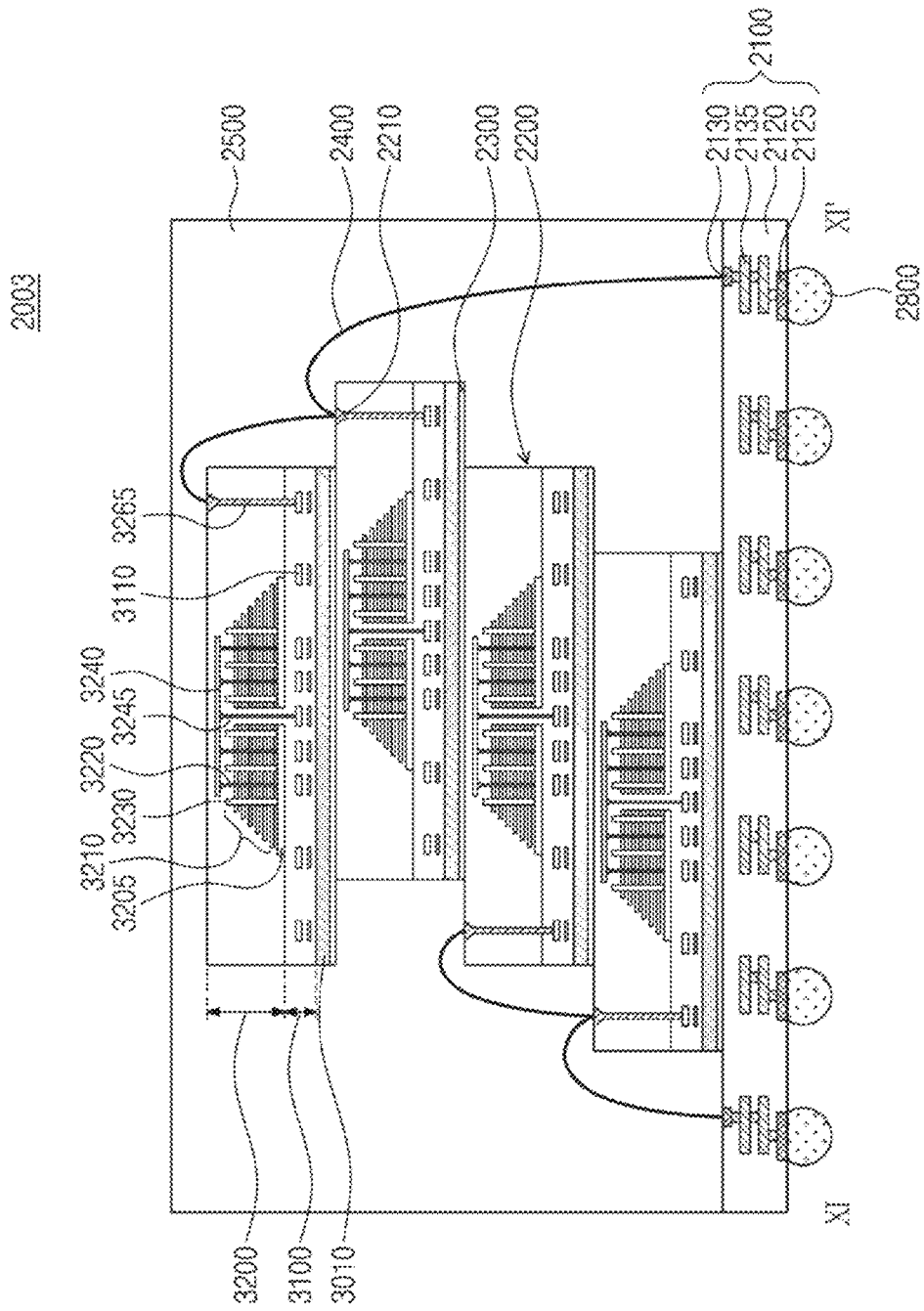
FIGS. 12 and 13 are cross-sectional views schematically illustrating semiconductor packages according to some example embodiments of the inventive concepts.
Figure 13:
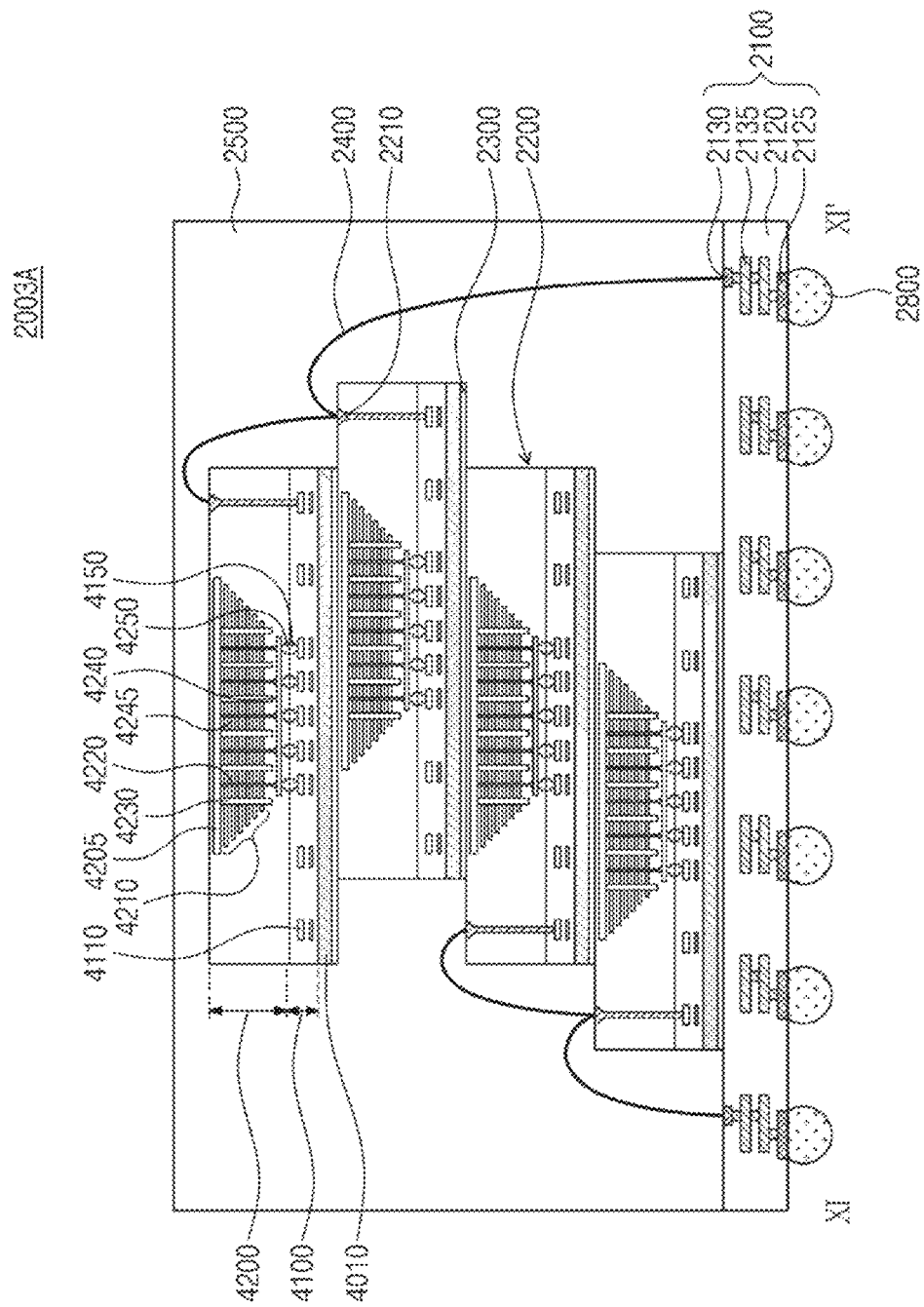

FIGS. 12 and 13 are cross-sectional views schematically illustrating semiconductor packages according to some example embodiments of the inventive concepts. FIGS. 12 and 13 each describe some example embodiments of the semiconductor package of FIG. 11, and conceptually illustrate a region cut along the line XI-XI' of the semiconductor package of FIG. 11.

Referring to FIG. 12, in the semiconductor package 2003, the package substrate 2100 may be a printed circuit board. The package substrate 2100 may include a package substrate body 2120, upper pads (2130 of FIG. 11) disposed on the top surface of the package substrate body 2120, lower pads 2125 disposed on or exposed through the bottom surface of the package substrate body 2120, and internal wirings 2135 electrically connecting the upper pads 2130 and the lower pads 2125 in the package substrate body 2120. The upper pads 2130 may be electrically connected to the connection structures 2400. The lower pads 2125 may be connected to the wiring patterns 2005 of the main board 2001 of the electronic system 2000 as shown in FIG. 11 through conductive connectors 2800.

Each of the semiconductor chips 2200 may include a semiconductor substrate 3010, and a first structure 3100 and a second structure 3200 that are sequentially stacked on the semiconductor substrate 3010. The first structure 3100 may include a peripheral circuit region including peripheral interconnections 3110 (also referred to herein interchangeably as peripheral wirings). The second structure 3200 may include source structure 3205, a stacked structure 3210 on the source structure 3205, vertical structures 3220 and separation structures 3230 passing through the stacked structure 3210, bit lines 3240 electrically connected to the vertical structures 3220, and cell contact plugs electrically connected to word lines (WL of FIG. 10) of the stacked structure 3210. Each of the first structure 3100/second structure 3200/semiconductor chips 2200 may further include separation structures to be described later.

Each of the semiconductor chips 2200 may include a through wire 3245 electrically connected to the peripheral wirings 3110 of the first structure 3100 and extending into the second structure 3200. The through wiring 3245 may be disposed outside the stack structure 3210, and may be further disposed to pass through the stack structure 3210. Each of the semiconductor chips 2200 may further include an input/output pad (2210 of FIG. 11) electrically connected to the peripheral wirings 3110 of the first structure 3100, for example via a through via structure 3265 (also referred to as a contact plug).

Referring to FIG. 13, in a semiconductor package 2003A, each of semiconductor chips 2200 may include a semiconductor substrate 4010, a first structure 4100 on the semiconductor substrate 4010, and a second structure 4200 bonded to the first structure 4100 by a wafer bonding method on the first structure 4100.

The first structure 4100 may include a peripheral circuit region including a peripheral wiring 4110 and first bonding structures 4150. The second structure 4200 may include a source structure 4205, a stacked structure 4210 between the source structure 4205 and the first structure 4100, vertical structures 4220 and a separation structure 4230 passing through the stacked structure 4210, and second junction structures 4250 electrically connected to the vertical structures 4220 and the word lines (WL of FIG. 10) of the stacked structure 4210 via the connection structures (e.g., cell contact plugs) 4235, respectively. For example, the second junction structures 4250 may be electrically connected to the vertical structures 4220 and word lines (WL of FIG. 10), respectively, through the cell contact plugs electrically connected to the bit lines 4240 and the word lines (WL in FIG. 10) electrically connected to the vertical structures 4220. The first bonding structures 4150 of the first structure 4100 and the second junction structures 4250 of the second structure 4200 may be bonded while being in contact with each other. Bonded portions of the first bonding structures 4150 and the second junction structures 4250 may be formed of, for example, copper (Cu).

Each of the first structure 4100/second structure 4200/semiconductor chips 2200 may further include a source structure according to some example embodiments described below. Each of the semiconductor chips 2200 may further include an input/output pad (2210 of FIG. 11) electrically connected to the peripheral wirings 4110 of the first structure 4100.

The semiconductor chips 2200 of FIG. 12 and the semiconductor chips 2200 of FIG. 13 may be electrically connected to each other by connection structures 2400 in a form of bonding wires. However, in some example embodiments, semiconductor chips in one semiconductor package, such as the semiconductor chips 2200 of FIG. 12 and the semiconductor chips 2200 of FIG. 13, may be electrically connected to each other by a connection structure including a through silicon via (TSV).

Figure 14:
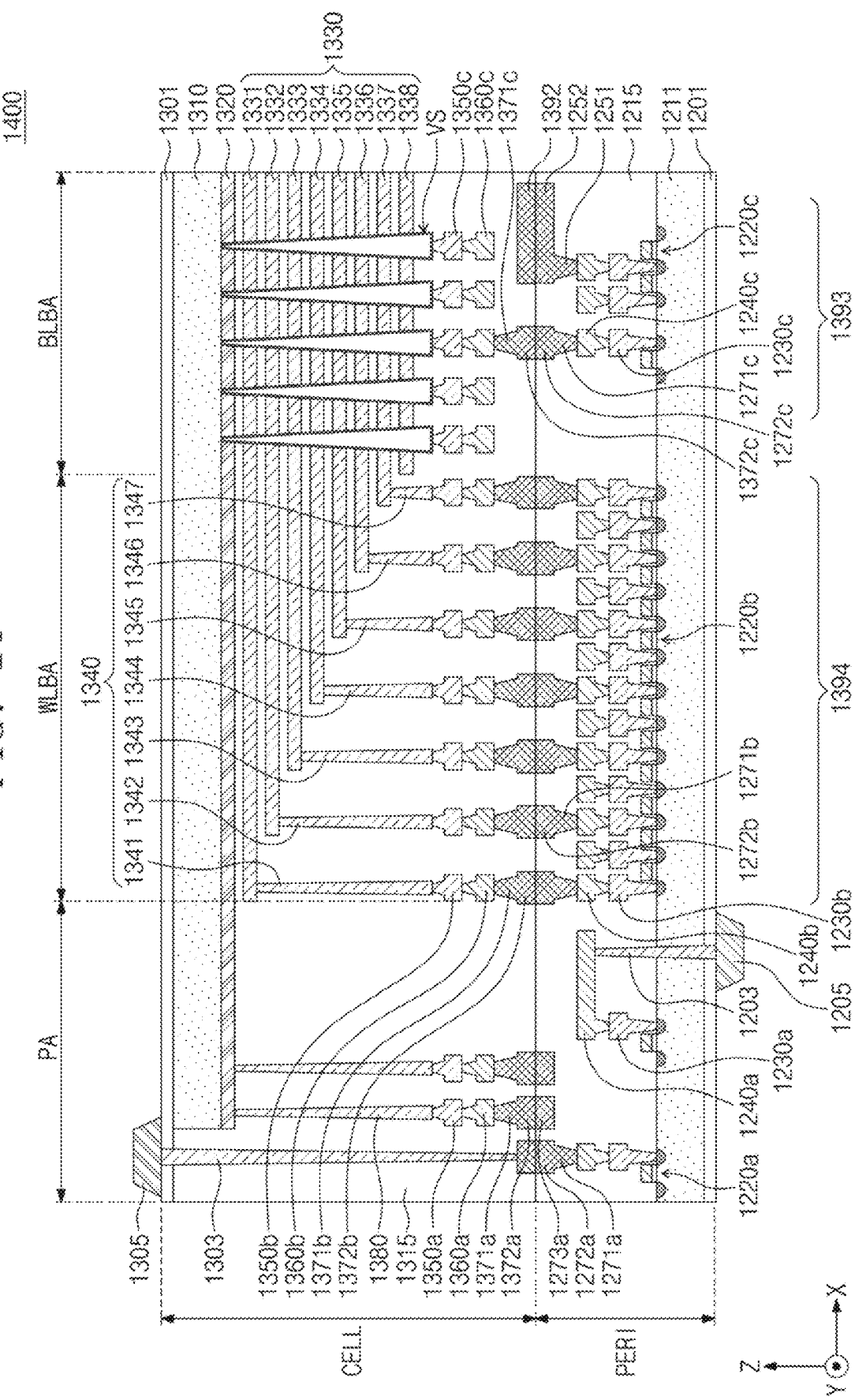
FIG. 14 is a cross-sectional view of a semiconductor memory device according to some example embodiments of the inventive concepts.

FIG. 14 is a cross-sectional view of a semiconductor memory device according to some example embodiments of the inventive concepts.

Referring to FIG. 14, a semiconductor memory device 1400 may have a chip to chip (C2C) structure. The C2C structure may manufactured by forming an upper an upper chip including a cell array structure CELL on a first wafer, forming a lower chip including a peripheral circuit structure PERI on a second wafer different from the first wafer, and connecting the upper chip and the lower chip to each other by a bonding method. For example, the bonding method may refer to a method of electrically connecting bonding metal formed on the uppermost metal layer of the upper chip and bonding metal formed om the uppermost metal layer of the lower chip to each other. For example, when the bonding metal is formed of copper (Cu), the bonding method may be a Cu-to-Cu bonding method, and the bonding metal may also be formed of aluminum (Al) or tungsten (W). Each of the peripheral circuit structure PERI and the cell array structure CELL of the semiconductor memory device 1400 may include an external pad bonding area PA, a word line bonding area WLBA, and a bit line bonding area BLBA.

The peripheral circuit structure PERI may include a first substrate 1211, an interlayer insulating layer 1215, a plurality of circuit devices 1220a, 1220b, and 1220c formed on the first substrate 1211, first metal layers 1230a, 1230b, and 1230c connected to each of the plurality of circuit devices 1220a, 1220b, and 1220c, and second metal layers 1240a, 1240b, 1240c formed on the first metal layers 1230a, 1230b, and 1230c. In some example embodiments, the first metal layers 1230a, 1230b, and 1230c may be formed of tungsten having a relatively high electrical resistivity, and the second metal layers 1240a, 1240b, and 1240c may be formed of copper having a relatively low electrical resistivity.

In the present specification, the first metal layers 1230a, 1230b, and 1230c and the second metal layers 1240a, 1240b, and 1240c are shown and described, but not limited thereto, and at least one or more metal layers may be further formed on the second metal layers 1240a, 1240b, and 1240c. At least a part of the one or more metal layers formed on the second metal layers 1240a, 1240b, and 1240c may be formed of aluminum having a lower electrical resistivity than copper forming the second metal layers 1240a, 1240b, and 1240c.

The interlayer insulating layer 1215 may be disposed on the first substrate 1211 to cover the plurality of circuit devices 1220a, 1220b, and 1220c, the first metal layers 1230a, 1230b, and 1230c, and the second metal layers 1240a, 1240b, and 1240c, and may include an insulating material such as silicon oxide or silicon nitride.

Lower bonding metals 1271b and 1272b may be formed on the second metal layer 1240b of the word line bonding area WLBA. In the word line bonding area WLBA, the lower bonding metals 1271b and 1272b of the peripheral circuit structure PERI may be electrically connected to upper bonding metals 1371b and 1372b of the cell array structure CELL by a bonding method. In addition, the lower bonding metals 1271b and 1272b and the upper bonding metals 1371b and 1372b may be formed of aluminum, copper, or tungsten.

The cell array structure CELL may provide at least one memory block. The cell array structure CELL may include a second substrate 1310 and a common source line 1320. A plurality of word lines 1330 (e.g., word lines 1331, 1332, 1333, 1334, 1335, 1336, 1337, and 1338) may be stacked on the second substrate 1310 in a direction perpendicular to a top surface of the second substrate 1310 (Z-axis direction). String select lines and a ground select line may be disposed above and below the word lines 1330, respectively, and the plurality of word lines 1330 may be disposed between the string select lines and the ground select line.

In the bit line bonding area BLBA, a vertical structure VS may extend in a direction (Z-axis direction) perpendicular to the top surface of the second substrate 1310 to pass through the word lines 1330, string selection lines, and ground selection line. The vertical structure VS may include substantially the same features as the vertical structure of the embodiments described above. The vertical structure VS may include a ferroelectric layer and a vertical channel layer, and the channel layer may be electrically connected to a first metal layer 1350*c* and a second metal layer 1360*c*. For example, the first metal layer 1350*c* may be a bit line contact, and the second metal layer 1360*c* may be a bit line. In some example embodiments, the bit line 1360*c* may extend in a first direction (Y-axis direction) parallel to the top surface of the second substrate 1310.

In some example embodiments, including the example embodiments shown in FIG. 14, an area in which the vertical structure VS and the bit line 1360*c* are disposed may be defined as the bit line bonding area BLBA. The bit line 1360*c* may be electrically connected to the circuit devices 1220*c* providing a page buffer 1393 of the bit line bonding area BLBA in the peripheral circuit structure PERI. For example, the bit line 1360*c* may be connected to the upper bonding metals 1371*c* and 1372*c* in the peripheral circuit structure PERI, and the upper bonding metals 1371*c* and 1372*c* may be connected to the lower bonding metals 1271*c* and 1272*c* connected to the circuit devices 1220*c* of the page buffer 1393.

In the word line bonding area WLBA, the word lines 1330 may extend in a second direction (X-axis direction) perpendicular to the first direction and parallel to the top surface of the second substrate 1310, and may be connected to the plurality of cell contact plugs 1340 (e.g., cell contact plugs, 1341, 1342, 1343, 1344, 1345, 1346, and 1347). The word lines 1330 and the cell contact plugs 1340 may be connected to one another through pads provided by extending at least some of the word lines 1330 to have different lengths in the second direction. A first metal layer 1350*b* and a second metal layer 1360*b* may be sequentially connected to the upper portions of the cell contact plugs 1340 connected to the word lines 1330. The cell contact plugs 1340 may be connected to the peripheral circuit structure PERI though the upper bonding metals 1371*b* and 1372*b* of the cell array structure CELL and the lower bonding metals 1271*b* and 1272*b* of the peripheral circuit structure PERI, in the word line bonding area WLBA. The cell contact plugs 1340 may be connected to the peripheral circuit structure PERI thorough the upper bonding metals 1371*b* and 1372*b* of the cell array structure CELL and the lower bonding metals 1271*b* and 1272*b* of the peripheral circuit structure PERI, in the word line bonding area WLBA.

The cell contact plugs 1340 may be electrically connected to the circuit devices 1220*b* forming a row decoder 1394 in the peripheral circuit structure PERI. In some example embodiments, operating voltages of the circuit devices 1220*b* forming the row decoder 1394 may be different from operating voltages of the circuit devices 1220*c* forming the page buffer 1393. For example, the operating voltages of the circuit devices 1220*c* forming the page buffer 1393 may be greater than the operating voltages of the circuit devices 1220*b* forming the row decoder 1394.

A common source line contact plug 1380 may be disposed in the external pad bonding area PA. The common source line contact plug 1380 may be formed of a metal, a metal compound, or a conductive material such as polysilicon, and may be electrically connected to the common source line 1320. A first metal layer 1350*a* and a second metal layer 1360*a* may be sequentially stacked on the common source line contact plug 1380. For example, an area in which the common source line contact plug 1380, the first metal layer 1350*a*, and the second metal layer 1360*a* are disposed may be defined as the external pad bonding area PA.

Meanwhile, input/output pads 1205 and 1305 may be disposed in the external pad bonding area PA. Referring to FIG. 14, a lower insulating layer 1201 covering the bottom surface of the first substrate 1211 may be formed under the first substrate 1211, and the first input/output pads 1205 may be formed on the lower insulating layer 1201. The first input/output pad 1205 may be connected to at least one of the plurality of circuit devices 1220*a*, 1220*b*, and 1220*c* disposed in the peripheral circuit structure PERI through the first input/output contact plug 1203, and may be separated from the first substrate 1211 by the lower insulating layer 1201. In addition, a side insulating layer may be disposed between the first input/output contact plug 1203 and the first substrate 1211 to electrically separate the first input/output contact plug 1203 from the first substrate 1211.

Referring to FIG. 14, an upper insulating layer 1301 covering a top surface of the second substrate 1310 may be formed on the second substrate 1310, and the second input/output pad 1305 may be formed on the upper insulating layer 1301. The second input/output pad 1305 may be connected to at least one of the plurality of circuit devices 1220*a*, 1220*b*, and 1220*c* disposed in the peripheral circuit structure PERI through the second input/output contact plug 1303. In some example embodiments, the second input/output pad 1305 may be electrically connected to the circuit device 1220*a*. The second input/output contact plug 1303 may be connected to lower bonding metals 1271*a* and 1272*a*, which are connected to the circuit devices 1220*a*.

In some example embodiments, the second substrate 1310 and the common source line 1320 may not be disposed in an area where the second input/output contact plug 1303 is disposed. In addition, the second input/output pad 1305 may not overlap the word lines 1330 in the third direction (Z-axis direction). Referring to FIG. 14, the second input/output contact plug 1303 may be separated from the second substrate 1310 in a direction parallel to the top surface of the second substrate 1310, and may pass through an interlayer insulating layer 1315 of the cell array structure CELL to be connected to the second input/output pad 1305.

In some example embodiments, the first input/output pad 1205 and the second input/output pad 1305 may be selectively formed. For example, the semiconductor memory device 1400 may include only the first input/output pad 1205 disposed on the first substrate 1211, or only the second input/output pad 1305 disposed on the second substrate 1310. In some example embodiments, the semiconductor memory device 1400 may include both the first input/output pad 1205 and the second input/output pad 1305.

In each of the external pad bonding area PA and the bit line bonding area BLBA included in each of the cell array structure CELL and the peripheral circuit area PERI, the metal pattern of the uppermost metal layer may exist as a dummy pattern, or the uppermost metal layer may be empty.

In the external pad bonding area PA, in correspondence to upper metal patterns 1371a and 1372a formed on the uppermost metal layer of the cell array structure CELL, the semiconductor memory device 1400 may form a lower metal pattern 1273a having the same shape as the upper metal pattern 1372a of the cell array structure CELL on the uppermost metal layer of the peripheral circuit structure PERI. The lower metal pattern 1273a formed on the uppermost metal layer of the peripheral circuit structure PERI may not be connected to a separate contact, in the peripheral circuit structure PERI. Similarly, in the external pad bonding area PA, in correspondence to a lower metal pattern 1273a formed on the uppermost metal layer of the peripheral circuit structure PERI, an upper metal pattern 1372a having the same shape as the lower metal pattern 1273a of the peripheral circuit structure PERI and an upper metal pattern 1371a may be formed on the upper metal layer of the cell array structure CELL.

The lower bonding metals 1271b and 1272b may be formed on the second metal layer 1240b of the word line bonding area WLBA. In the word line bonding area WLBA, the lower bonding metals 1271b and 1272b of the peripheral circuit structure PERI may be electrically connected to the upper bonding metals 1371b and 1372b of the cell array structure CELL by a bonding method.

In addition, in the bit line bonding area BLBA, in correspondence to a lower metal pattern 1252 formed on the uppermost metal layer of the peripheral circuit structure PERI, an upper metal pattern 1392 having the same shape as the lower metal pattern 1252 of the peripheral circuit structure PERI may be formed on the uppermost metal layer of the cell array structure CELL. The lower metal pattern 1252 may be connected to lower bonding metal 1251, which may be connected to the circuit devices 1220c of the page buffer 1393. A contact may not be formed on the upper metal pattern 1392 formed on the uppermost metal layer of the cell array structure CELL.

According to some example embodiments of the inventive concepts, the ferroelectric layer may be disposed between the vertical channel layer and the back gate electrode, and thus the data disturbance in the unselected cell may be reduced. For example, based on a semiconductor memory device including at least a back gate electrode BGP, a gate electrode WL on the back gate electrode, a vertical channel layer VC between the gate electrode WL and the back gate electrode BGP, a gate insulating layer GIL between the vertical channel layer VC and the gate electrode WL, and a ferroelectric layer FEL between the back gate electrode BGP and the vertical channel layer VC according to some example embodiments, for example the semiconductor memory device as shown in at least on of FIGS. 3A to 5D, such that the ferroelectric layer FEL may be between the vertical channel layer VC and the back gate electrode BGP, program disturbance (e.g., pass disturbance, data disturbance, etc.) associated with the semiconductor memory device including the ferroelectric layer FEL may be reduced, thereby enabling the semiconductor memory device including the ferroelectric layer FEL to have improved performance. Accordingly, the low-power and high-speed semiconductor memory device using the ferroelectric layer may be implemented.

As described herein, any devices, systems, modules, units, controllers, circuits, and/or portions thereof according to any of the example embodiments (including, without limitation, the electronic system 1000, semiconductor device 1100, controller 1200, decoder circuit 1110, page buffer circuit 1120, logic circuit 1130, processor 1210, NAND controller 1220, electronic system 2000, controller 2002, semiconductor packages 2003, DRAM 2004, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, units, controllers, circuits, and/or portions thereof according to any of the example embodiments, and/or any portions thereof.

While some example embodiments of the inventive concepts have been particularly shown and described, it will be understood by one of ordinary skill in the art that variations in form and detail may be made therein without departing from the spirit and scope of the attached claims.

What is claimed is:

1. A semiconductor memory device, comprising:
a back gate electrode;
a gate electrode on the back gate electrode;
a channel layer between the gate electrode and the back gate electrode;
a gate insulating layer between the channel layer and the gate electrode; and
a ferroelectric layer between the back gate electrode and the channel layer,
wherein the back gate electrode has a pillar shape extending in a first direction.

2. The semiconductor memory device of claim 1, wherein the back gate electrode, the channel layer, and the ferroelectric layer extend in a first direction, in parallel with one another.

3. The semiconductor memory device of claim 2, wherein the gate electrode surrounds the back gate electrode and extends in a second direction different from the first direction.

4. The semiconductor memory device of claim 1, wherein the gate insulating layer includes a non-ferroelectric material.

5. A semiconductor memory device, comprising:
a plurality of cell strings connected between a bit line and a common source line, each cell string of the plurality of cell strings including a plurality of cell transistors connected in series,
wherein each cell transistor of the plurality of cell transistors includes
a back gate electrode,
a gate electrode surrounding the back gate electrode,
a channel layer between the gate electrode and the back gate electrode, a ferroelectric layer between the channel layer and the back gate electrode, and a gate insulating layer between the gate electrode and the channel layer.

6. The semiconductor memory device of claim 5, wherein, in each cell string of the plurality of cell strings, the back gate electrode, the channel layer, and the ferroelectric layer are common to the plurality of cell transistors of the cell string.

7. The semiconductor memory device of claim 5, wherein, in each cell string of the plurality of cell strings, the back gate electrode, the channel layer, and the ferroelectric layer extend in a first direction.

8. The semiconductor memory device of claim 7, wherein, in each cell string of the plurality of cell strings, respective gate electrodes of the plurality of cell transistors extend in a second direction different from the first direction.

9. The semiconductor memory device of claim 5, wherein the ferroelectric layer is configured to have a polarization of a dipole in the ferroelectric layer that is configured to be changed by an electric field applied between the back gate electrode and the channel layer.

10. The semiconductor memory device of claim 5, wherein the channel layer is configured to include a depletion region adjacent to a selected gate electrode of respective gate electrodes of the plurality of cell transistors and an inversion region adjacent to unselected gate electrodes of the respective gate electrodes of the plurality of cell transistors.

11. The semiconductor memory device of claim 5, wherein each cell string of the plurality of cell strings includes:
a plurality of gate electrodes vertically stacked on a substrate;
the back gate electrode passing through the plurality of gate electrodes;
the channel layer between the gate electrodes and the back gate electrode; and
a vertical insulating layer between the channel layer and the back gate electrode.

12. The semiconductor memory device of claim 5, further comprising:
a string select transistor connected between the bit line and a cell transistor of the plurality of cell transistors adjacent thereto; and
a ground select transistor connected between the common source line and another cell transistor of the plurality of cell transistors adjacent thereto.

13. A semiconductor memory device, comprising:
a stacked structure including gate electrodes and interlayer insulating layers vertically alternately stacked on a substrate; and
vertical structures passing through the stacked structure, wherein each vertical structure of the vertical structures includes
a back gate electrode extending in a first direction perpendicular to a top surface of the substrate,
a ferroelectric layer surrounding the back gate electrode, and
a channel layer surrounding the ferroelectric layer.

14. The semiconductor memory device of claim 13, wherein each vertical structure of the vertical structures further includes a gate insulating layer between the stacked structure and the channel layer.

15. The semiconductor memory device of claim 14, wherein the gate insulating layer extends in the first direction.

16. The semiconductor memory device of claim 14, wherein the gate insulating layer includes a first gate insulating layer extending in the first direction and a second gate insulating layer covering top and bottom surfaces of the gate electrodes.

17. The semiconductor memory device of claim 14, wherein the gate insulating layer includes an insulating material different from an insulating material of the ferroelectric layer.

18. The semiconductor memory device of claim 13, wherein the ferroelectric layer has a first side in contact with the channel layer and a second side in contact with the back gate electrode.

19. The semiconductor memory device of claim 13, further comprising:
a bit line connected to the channel layer; and
a back gate line connected to the back gate electrode.

* * * * *